United States Patent
Hayashi et al.

(10) Patent No.: US 6,968,988 B2
(45) Date of Patent: Nov. 29, 2005

(54) BINDING MACHINE FOR GARDENING

(75) Inventors: Susumu Hayashi, Tokyo (JP); Makito Fukada, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 10/483,287

(22) PCT Filed: Jul. 10, 2002

(86) PCT No.: PCT/JP02/07023

§ 371 (c)(1),
(2), (4) Date: Jul. 19, 2004

(87) PCT Pub. No.: WO03/005805

PCT Pub. Date: Jan. 23, 2003

(65) Prior Publication Data

US 2004/0237805 A1  Dec. 2, 2004

(30) Foreign Application Priority Data

| Jul. 11, 2001 | (JP) | 2001-211431 |
| Aug. 8, 2001 | (JP) | 2001-241344 |
| Aug. 10, 2001 | (JP) | 2001-244927 |
| Mar. 20, 2002 | (JP) | 2002-077623 |
| Jun. 13, 2002 | (JP) | 2002-173097 |

(51) Int. Cl.$^7$ .......................... A01G 17/08; B25B 13/02

(52) U.S. Cl. .......................... 227/76; 227/108; 227/152

(58) Field of Search .......................... 227/108, 76, 152, 227/153, 140, 156; 29/701, 771; 56/14.6; 156/495, 530; 140/121, 123

(56) References Cited

U.S. PATENT DOCUMENTS

| 2,996,720 | A | * | 8/1961 | Mackechnie | 227/76 |
| 3,224,657 | A | * | 12/1965 | Zike | 227/88 |
| 3,589,585 | A | * | 6/1971 | Cerioni | 227/76 |
| 3,595,461 | A | * | 7/1971 | Boucher | 227/108 |
| 3,603,497 | A | * | 9/1971 | Nishikawa | 227/76 |
| 3,762,621 | A | * | 10/1973 | Nishikawa | 227/76 |
| 3,771,707 | A | * | 11/1973 | Nishikawa | 227/76 |
| 3,848,789 | A | * | 11/1974 | Baker et al. | 227/76 |
| 5,467,524 | A | * | 11/1995 | Diemer | 29/701 |
| 5,632,135 | A | * | 5/1997 | Baker et al. | 56/14.6 |

FOREIGN PATENT DOCUMENTS

| JP | 52-42689 | 10/1977 |
| JP | 53-15673 | 4/1978 |
| JP | 2001-55203 | 2/2001 |

* cited by examiner

*Primary Examiner*—Scott A. Smith
(74) *Attorney, Agent, or Firm*—Morgan, Lewis & Bockius LLP

(57) ABSTRACT

A stopper portion (108c) is formed at an upper end of a picking plate (108) of a tape grasping apparatus. When a driver handle (102) and a clincher arm (107) are closed, the picking plate arranged at the clincher arm is pivoted to this side and a claw (108b) of the picking plate is pierced to a front end portion of the tape (T) and the stopper portion (108c) impinges on a tape guide (106) of the driver handle to stop the picking plate. When the driver handle and the clincher arm are opened, the stopper portion is detached from the tape guide and the picking plate (108) is brought into elastic contact with a tape support plate (111) to clamp the tape. When the claw of the picking plate is pierced into the tape, the tape is not applied with strong tension and the claw can be prevented from breaking the tape.

8 Claims, 35 Drawing Sheets

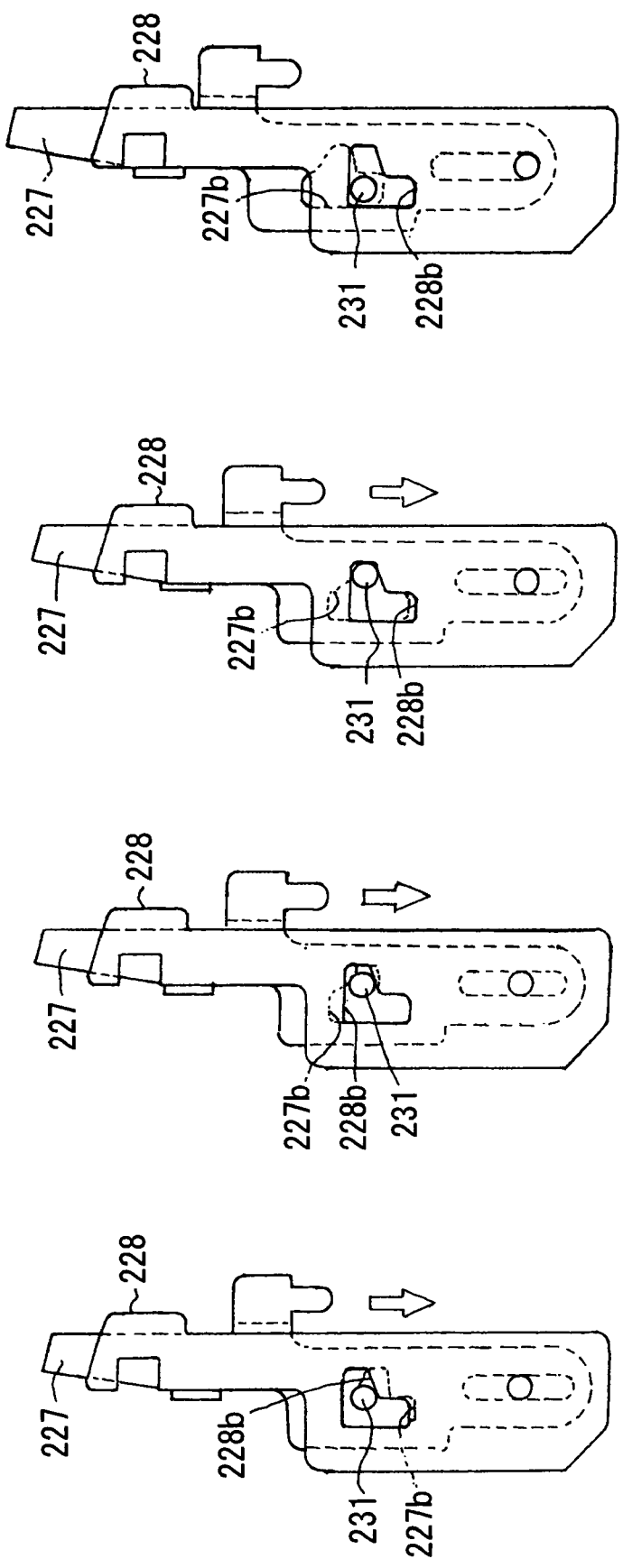

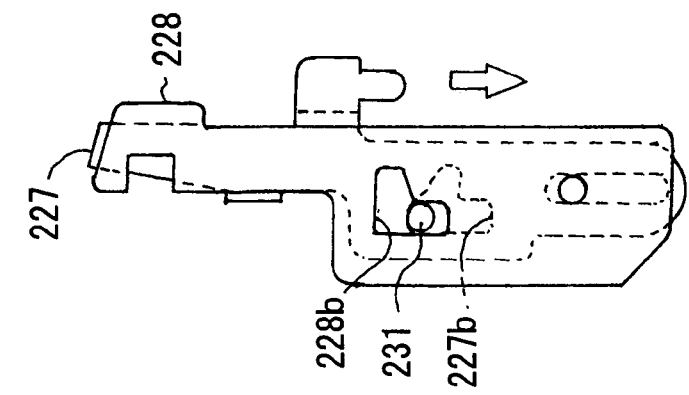
Fig. 15(e)  Fig. 15(f)
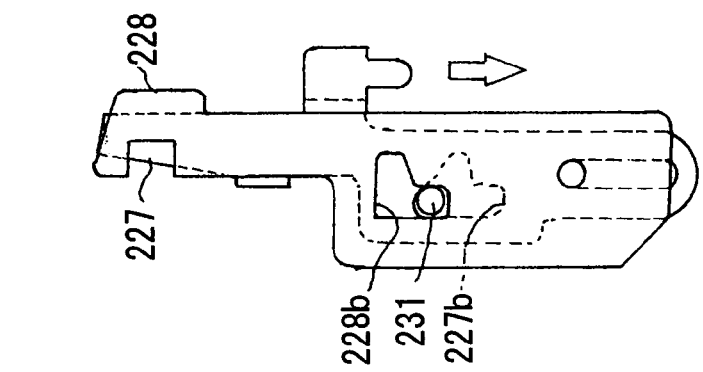
Fig. 15(g)  Fig. 15(h)
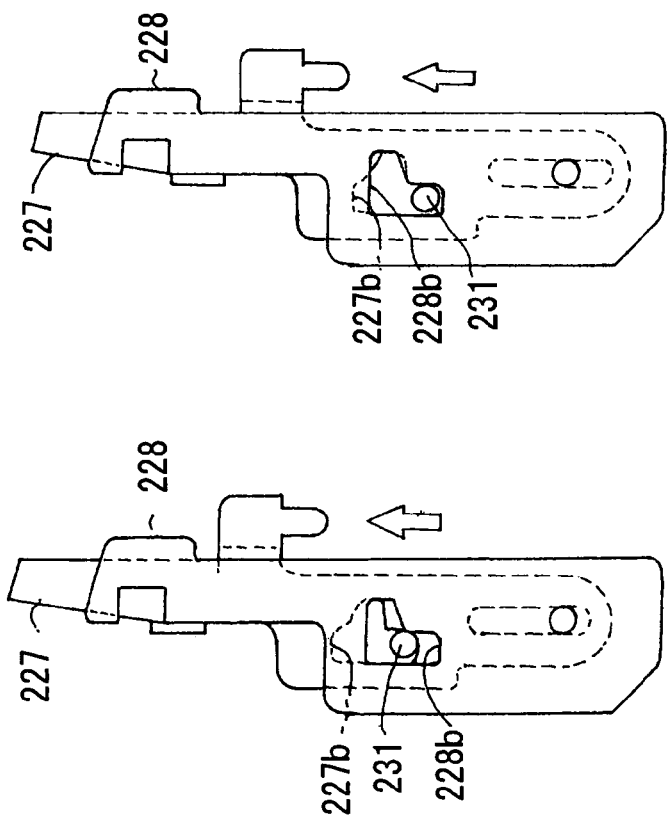

PRIOR ART

PRIOR ART

BINDING MACHINE FOR GARDENING

TECHNICAL FIELD

The present invention relates a gardening binder, particularly relates to a gardening binder preventing a front end of a binding tape from being broken or a gardening binder preventing a residue of a binding tape from being brought about.

BACKGROUND ART

In cultivating agricultural products of cucumber, melon, grape, tomato and the like, there is used a gardening binder for binding operation for making ivies or branches of the plants go along with stays or shelves. A gardening binder is a hand-held stapler type tool combined with a driver handle and a clincher arm, a tape magazine is attached to a rear portion of the driver handle and a tape charged to the tape magazine is made to pass through inside of the driver handle and is extracted by way of a tape guide at a front end thereof.

When the driver handle and the clincher arm are once closed, a front end of the tape coming out from the tape guide is caught by a tape grasping apparatus provided to the clincher arm and when the driver handle and the clincher arm are opened, the tape is stretched between the driver handle and the clincher arm. Further, when the tape is hung around branches of an agriculture product and a stay and the driver handle and the clincher arm are closed by a force stronger than that at the previous time, both ends of a tape loop hung around branches or the like are bound by a staple and at the same time, both end portions of the tape loop are cut by a cutter blade of the driver handle.

The tape grasping apparatus is provided with a tape support plate of a fixed type and a picking plate pivoted in a front and rear direction, a front end of the picking plate is formed with a claw in a wedge shape projected in a direction of the tape support plate and the claw is rapidly pivoted by a cam mechanism and a spring to pierce the tape and push the tape to the tape support plate to grasp.

However, depending on a design specification of the gardening binder, there is a case in which when the claw of the picking plate pierces the tape and is pulled in the direction of the tape support plate, the claw pulls to break the tape and the tape cannot be grasped. Hence, there is brought about a technical problem to be resolved in order to prevent the accident of breaking the front end of the tape by the picking plate and it is a first object of the invention to resolve the above-described problem.

An explanation will be given of a further technical problem in reference to a constitution and operation of the gardening binder of the related art as follows.

FIG. 28 shows a gardening binder 601 which is a hand-held tool combined with a driver handle 602, a clincher arm 603 and a lower handle 604 in a shape of pliers, a tape magazine 605 is attached to a rear portion of the driver handle 602, a tape for gardening is charged to the tape magazine 605 to pass inside of the driver handle 602 and the tape is extracted from a tape guide 607 provided at a front end of a staple magazine 606.

As shown by FIG. 29, a front end of the clincher arm 603 is attached with a clincher 608, and a slightly front side of the clincher 608 is arranged with a tape grasping apparatus combined with a picking plate 609 and a push plate 610 and a fixed cam plate (not illustrated). Although illustration is omitted, a pin of the picking plate 609 is engaged with a groove cam of the upwardly and downwardly slidable push plate 610 and a groove cam of the fixed cam plate and when the push plate 610 which is projected upwardly by a spring is pushed down, the picking plate 609 is pivoted to this side by cooperative operation of the groove cam of the push plate 610 and the groove cam of the fixed cam plate and the push plate 610 is locked at a position at which the push plate 610 is pushed in. Further, when the push plate 610 is further pushed in, locking is released, when pressing is released, the push plate 610 returns to an initial position and the picking plate 610 is pivoted to a rear side to return to an initial position.

In binding operation, when the push plate 610 is pushed in by one stage by grasping to close the upper and lower handles 620 and 604, the picking plate 609 is pivoted to this side, the wedge shape claw formed at the front end of the picking plate 609 pierces the front end portion of the tape and the front end portion of the tape is pinched by the picking plate 609 and a fixed tape support plate 611. Further, when the upper and lower handles 602 and 604 are once opened by releasing the handle operation, the front end of the tape is pulled by the picking plate 609 to extract from the tape guide 607 to thereby bring about a state of stretching the tape between the driver handle 602 and the clincher arm 603. When branches of the agricultural product and the stay are put between the driver handle 602 and the clincher arm 603 under the state, the tape is hung around the branches and the stay (not illustrated).

Further, when the upper and lower handles 602 and 604 are further strongly grasped from a state of closing the upper and lower handles 602 and 604 as shown by FIG. 30, a staple driver 612 provided at the driver handle 602 is further moved down to push out a staple (not illustrated) at inside of the staple magazine 606, the staple penetrating an overlapped portion of the tape T butts the clincher 608 to fold to bend to bind the tape T and a cutter blade 613 in a shape of a rugged blade is pushed to cut the tape T at a vicinity of a bound portion. Further, when locking is released by deeply pushing the push plate 610 and the upper and lower handles 602 and 604 are returned to the initial positions, the picking plate 609 and the push plate 610 return to initial positions shown in FIG. 28.

According to the gardening binder of the related art, the tape is cut at a position slightly downstream from the front end of the tape T pinched by the picking plate 609 and the tape support plate 611 and therefore, the front end portion of the tape pierced by the picking plate 609 remains at the tape support plate 611. Further, there is a case in which by piling up the residues, the front end portion of the tape cannot be grasped or the residues are packed to a rotating shaft or a sliding portion of the handle portion or the like to thereby bring about a failure in operation.

Further, in the above-described binding and tape cutting stroke, as shown by FIG. 30, a head portion of the picking plate 609 is brought into a groove formed at a center of a lower end of the tape guide 607 to hold the tape T. Thereby, a center portion in left and right direction of the tape T is pushed to deform in an inverse-V like shape, the deformation is extended to a portion of the tape T to be cut and therefore, the cutter blade 613 is not brought into contact uniformly with the tape T and there is a case in which the tape T cannot be cut linearly or after a top portion of the inverse-V like shape is cut, the tape T is moved by cutting stress to thereby bring about a failure in cutting. Further, at low temperatures, there poses a problem that the front end portion of the tape brought into the groove at the center of the tape guide 607 remains to be deformed and is not recovered and at a successive operational cycle, the picking plate 609 grasps the front end portion of the tape which is folded in two and the portion is cut by the cutter blade 613 and therefore, an amount of the residue is increased.

Hence, there is brought about a technical problem to be resolved by preventing a residue of a tape from being brought about to facilitate to handle a gardening binder and to promote certainty in cutting the tape and it is a second object of the invention to resolve the above-described problem.

DISCLOSURE OF THE INVENTION

The invention has been proposed to achieve the above-described object and according to a first aspect of the invention, there is provided a gardening binder characterized in being constituted such that a tape guide is provided at a front end of a driver handle of a stapler, a clincher arm is provided with a tape grasping apparatus comprising a cam driving type picking plate and a tape support plate, when the driver handle and the clincher arm are closed, a claw of the picking plate of the tape grasping apparatus pierces a front end portion of a tape extracted from the tape guide to press to a tape support plate, the tape stretched between the driver handle and the clincher arm is hung around at a surrounding of an object to be bound by opening the driver handle and the clincher arm, an overlapped portion of a tape loop is bound by a staple by closing the driver handle and the clincher arm and the tape is cut by a cutter blade provided at the driver handle, wherein a stopper portion is formed at an upper portion of the picking plate, the stopper portion impinges on the tape guide of the driver handle to stop the picking plate in catching the tape and by opening the driver handle and the clincher arm, the stopper portion is detached from the tape guide and the picking plate and is brought into elastic contact with the tape support plate.

Further, according to a second aspect of the invention, there is provided a gardening binder characterized in being constituted such that a tape extracting port is provided at a front end of a driver handle of a stapler, a clincher arm is provided with a tape grasping apparatus comprising a cam driving type picking plate and a pate support plate, when the driver handle and the clincher arm are closed, a front end portion of a tape extracted from the tape extracting port of the driver handle is caught by the tape grasping apparatus, the tape stretched between the driver handle and the clincher arm is hung around at a surrounding of an object to be bound by opening the driver handle and the clincher arm, an overlapped portion of a tape loop is bound by a staple by closing the driver handle and the clincher arm and the tape is cut by a cutter blade provided at the driver hand, wherein a cam mechanism is constituted such that the tape support plate of the tape grasping apparatus is displaced in a direction of a pivoting axis of the driver handle and the clincher arm more than the cutter blade provided at the driver handle and the picking plate is regressed to separate from the tape support plate in cutting the tape.

Further, according to a third aspect of the invention, there is provided a gardening binder characterized in being constituted such that a tape guide constituting a tape extracting port is provided at a front end of a driver handle of a stapler, a clincher arm is provided with a tape grasping apparatus comprising a cam driving type picking plate and a tape support plate, a claw formed at an upper portion of a front face of the picking plate pierces a tape to press to the tape support plate by closing the driver handle and the clincher arm, the tape is hung around an object to be bound after developing the tape between the driver handle and the clincher arm by opening the driver handle and the clincher arm, an overlapped portion of a tape loop is bound by a staple by closing the driver handle and the clincher arm and the tape is cut by a cutter blade provided at the driver handle, wherein the cutter blade is arranged to move up and down between the picking plate and the tape support plate, a lower side of the claw of the picking plate is provided with a projected portion projected more than the claw and a cam mechanism for driving the picking plate is constituted such that the claw of the picking plate is escaped from a path of the cutter blade and a front end portion of the tape is held outside of the path of the cutter blade by the projected portion in cutting the tape.

Further, it is preferable to constitute an interval between the claw of the picking plate and the projected portion therebelow by a recessed curved face.

Further, it is also preferable in the gardening binder in which a groove is formed from a center of a lower end of the tape guide in an upper direction and when the driver handle and the clincher arm are closed, the tape is pinched by a head portion of the picking plate and the groove of the tape guide that when the driver handle and the clincher arm are closed, a height of a lower end face of the tape guide and a height of the head portion of the picking plate are formed to substantially coincide with each other, the picking plate presses the tape to the lower end face of the tape guide to pinch and the head portion of the picking plate is restrained from advancing to a depth side of the groove of the tape guide to prevent the tape from being deformed.

Further, according to a fourth aspect of the invention, there is provided a gardening binder characterized in a gardening binder in which a tape stretched between a driver handle and a clincher arm is hung around at a surrounding of an object to be bound, by closing the driver handle and the clincher arm, a staple magazine on a side of the driver handle and a clincher of the clincher arm are brought into contact with each other to overlap to pinch a front end portion of a tape and a downstream portion, an overlapped portion of the tape is bound by a staple and the tape is cut by a cutter blade provided at the driver handle and in a gardening binder constituted such that the clincher arm is provided with a tape grasping apparatus comprising a movable picking plate and a tape support plate, the picking plate is moved to be brought into press contact with the tape support plate by closing the driver handle and the clincher arm, the front end portion of the tape is grasped by the picking plate and the tape support plate, a cam mechanism regresses the picking plate to an initial position by closing the driver handle and the clincher arm and the cutter blade provided at the driver handle cuts the tape by passing an interval between the picking plate and the tape support plate, wherein a height difference is provided in a height of the tape support plate and a height of the picking plate to bring the picking plate in a lower attitude and an operational timing of the cam mechanism is set such that the picking plate is separated from the tape support plate after the cutter blade is moved down to a position of the upper end of the tape support plate in operating to close the driver handle and the clincher arm.

Further, it is also preferable to constitute such that when the driver handle and the clincher arm are operated to close, after the cutter blade is moved down to the position of the upper end of the tape support plate, a staple magazine on a side of the driver handle and the clincher of the clincher arm are brought into contact with each other.

BRIEF DESCRIPTION OF THE DRAWINGS

FIGS. 15(a) through 15(h) are operational stroke views of the tape grasping apparatus.

Figure 1:
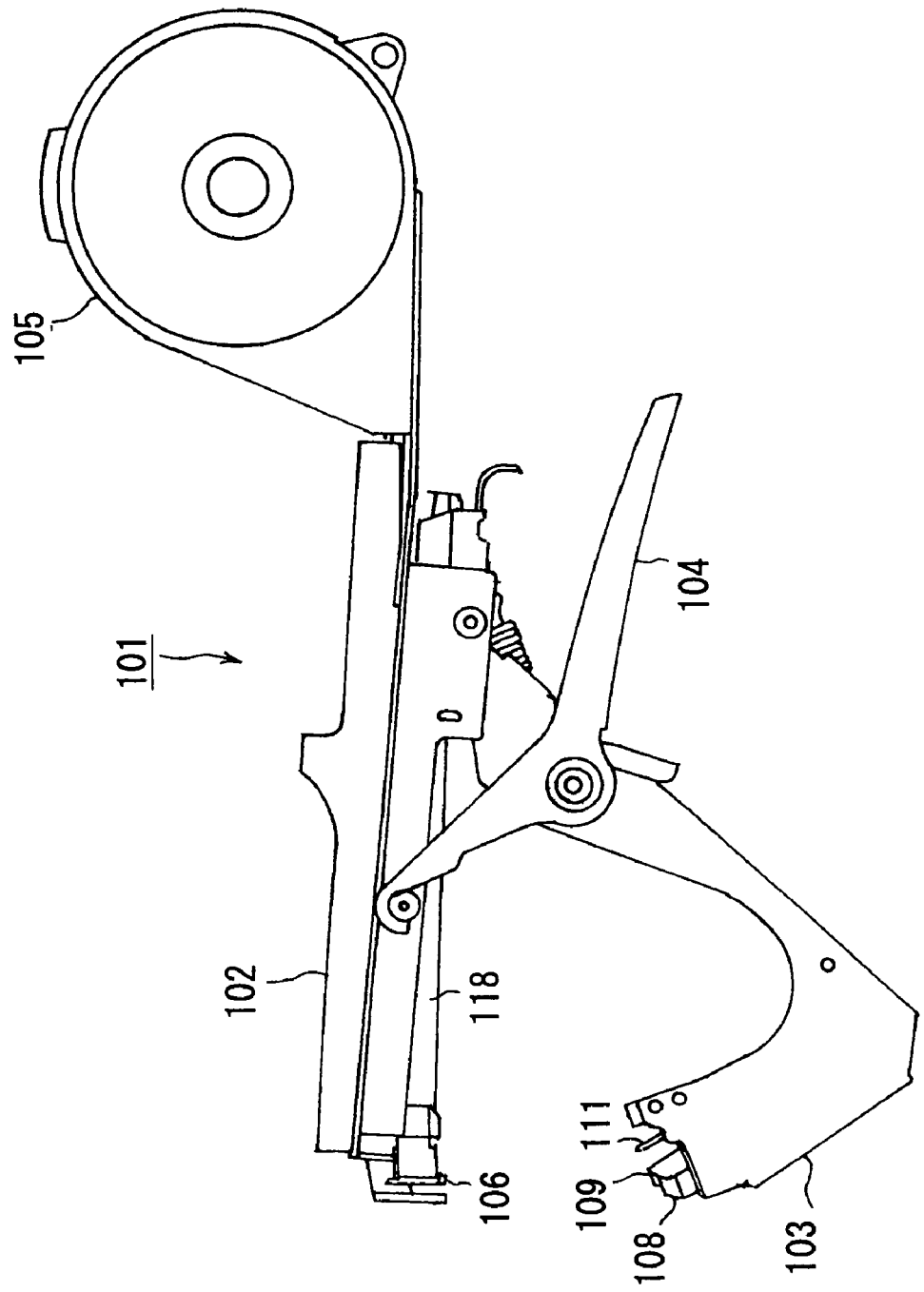
FIG. 1 is a side view of a gardening binder showing a first embodiment of the invention.

Further, in the drawings, notation 101 designates a gardening binder, notation 102 designates a driver handle, notation 103 designates a clincher arm, notation 104 designates a lower handle, notation 105 designates a tape magazine, notation 106 designates a tape guide, notation 107 designates a tape grasping apparatus, notation 108 designates a picking plate, notation 108b designates a claw, notation 108c designates a stopper portion, notation 109 designates a push plate, notation 110 designates a fixed cam plate, notation 111 designates a tape support plate, notation 114 designates a pin, notation 116 designates a cutter blade, notation 117 designates a clincher, notation 118 designates a staple magazine, notation 119 designates a staple driver, notation 221 designates a clincher arm, notation 222 designates a tape support plate, notation 222a designates a groove hole, notation 223 designates a driver handle, notation 224 designates a cutter blade, notation 225 designates a tape grasping apparatus, notation 226 designates a picking plate, notation 226b designates a claw, notation 226c designates a projected portion, notation 227 designates a push plate, notation 227b designates a groove cam, notation 227c designates a spring receiver, notation 228 designates a fixed cam plate, notation 228b designates a groove cam, notation 231 designates a pin, notation 232 designates a tape guide, notation 232a designates a groove, notation 234 designates a staple driver, notation 235 designates a clincher, notation 236 designates a staple magazine, notation 501 designates a gardening binder, notation 502 designates a driver handle, notation 503 designates a clincher arm, notation 504 designates a lower handle, notation 507 designates a staple magazine, notation 510 designates a cutter blade, notation 511 designates a driver, notation 512 designates a clincher, notation 513 designates a picking plate, notation 515 designates a tape support plate, notation 516 designates a stopper, notation 517 designates a clutch lever, notation 518 designates a push plate, notation 521 designates a projected portion, notation 522 designates a roller, notation 523 designates an inclined cam face, notation 523a designates a lower cam face, notation 523b designates an upper cam face, notation 523c designates a top point and notation T designates a tape.

BEST MODE FOR CARRYING OUT THE INVENTION

A first embodiment of the invention will be described in details in reference to the drawings as follows. FIG. 1 shows the gardening binder 101, the driver handle 102, the clincher arm 103 and the lower handle 104 are combined in a shape of a plier, a tape for gardening is charged to the tape magazine 105 at a rear portion of the driver handle 102 and the tape is extracted by way of inside of the driver handle 102 and a tape guide at a front end thereof.

Figure 2:
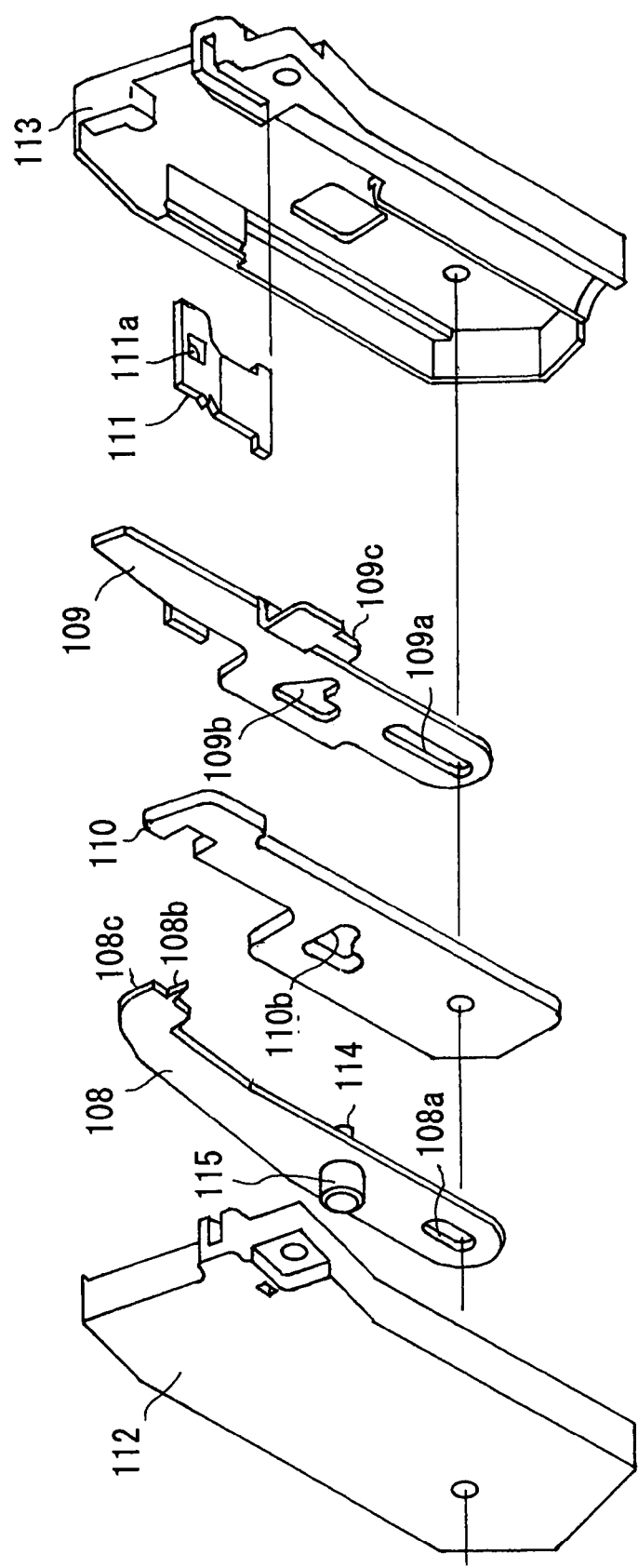
FIG. 2 is a disassembled view of a tape grasping apparatus.

FIG. 2 shows the tape grasping apparatus 107 attached to inside of the clincher arm 103 and the picking plate 108, the push plate 109, the fixed cam plate 110 and the tape support plate 111 are integrated into cases 112, 113 divided to the left and to the right. A pin (not illustrated) is inserted into rear long holes 108a, 109a of the picking plate 108 and the push plate 109 and the pin 114 provided at a middle portion of the picking plate 108 is inserted into a groove cam 110b of the fixed cam plate 110 and a groove cam 109b of the push plate 109. The push plate 109 is integrated into the cases 112, 113 by engaging a compression coil spring (not illustrated) to a spring receiver 109c at a front portion thereof and also the picking plate 108 is integrated into the cases 112 and 113 by attaching a torsional coil spring (not illustrated) to a shaft 115 thereof. By the springs, the push plate 109 is urged to an upper side and an upper portion of the picking plate 108 is urged in a direction of pivoting to this side. A height of the picking plate 108 is higher than that of the shape of the related art, the picking plate 108 is formed with a stopper portion 108c on an upper side of a claw 108b in a wedge shape projected from an upper portion thereof to this side and is constituted such that in picking the tape, the stopper portion 108c is butted to the tape guide 106 to stop the picking plate 108.

A groove hole 111a is formed at a center in a left and right direction of the tape support plate 111 and when the picking plate 108 is pivoted to this side, the claw 108b of the picking plate 108 advances into the groove hole 111a to thereby clamp the tape by the picking plate 108 and the tape support plate 111.

Figure 3B:
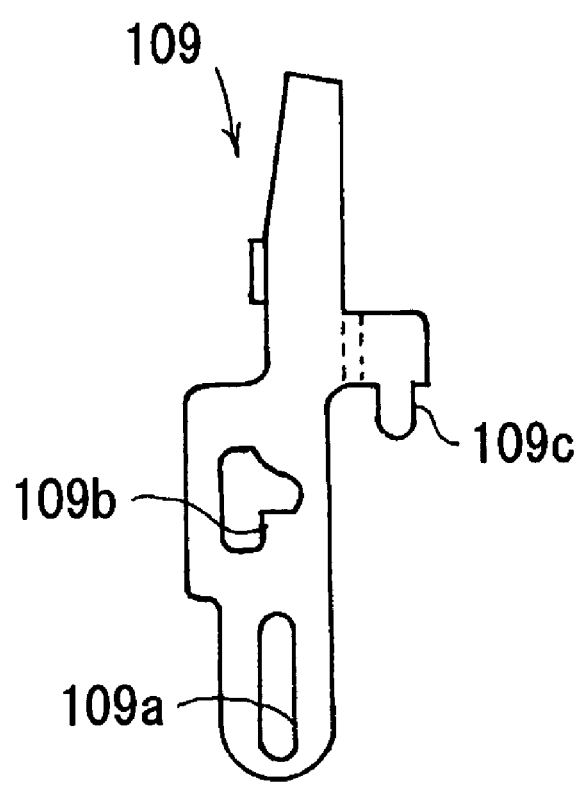
FIG. 3(a) is a side view of a fixed cam plate and FIG. 3(b) is a side view of a push plate.
Figure 3A:
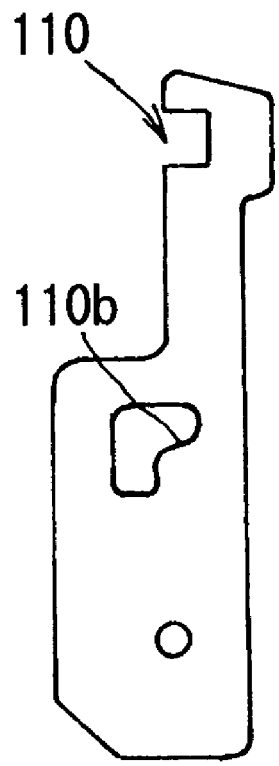
Figure 4:
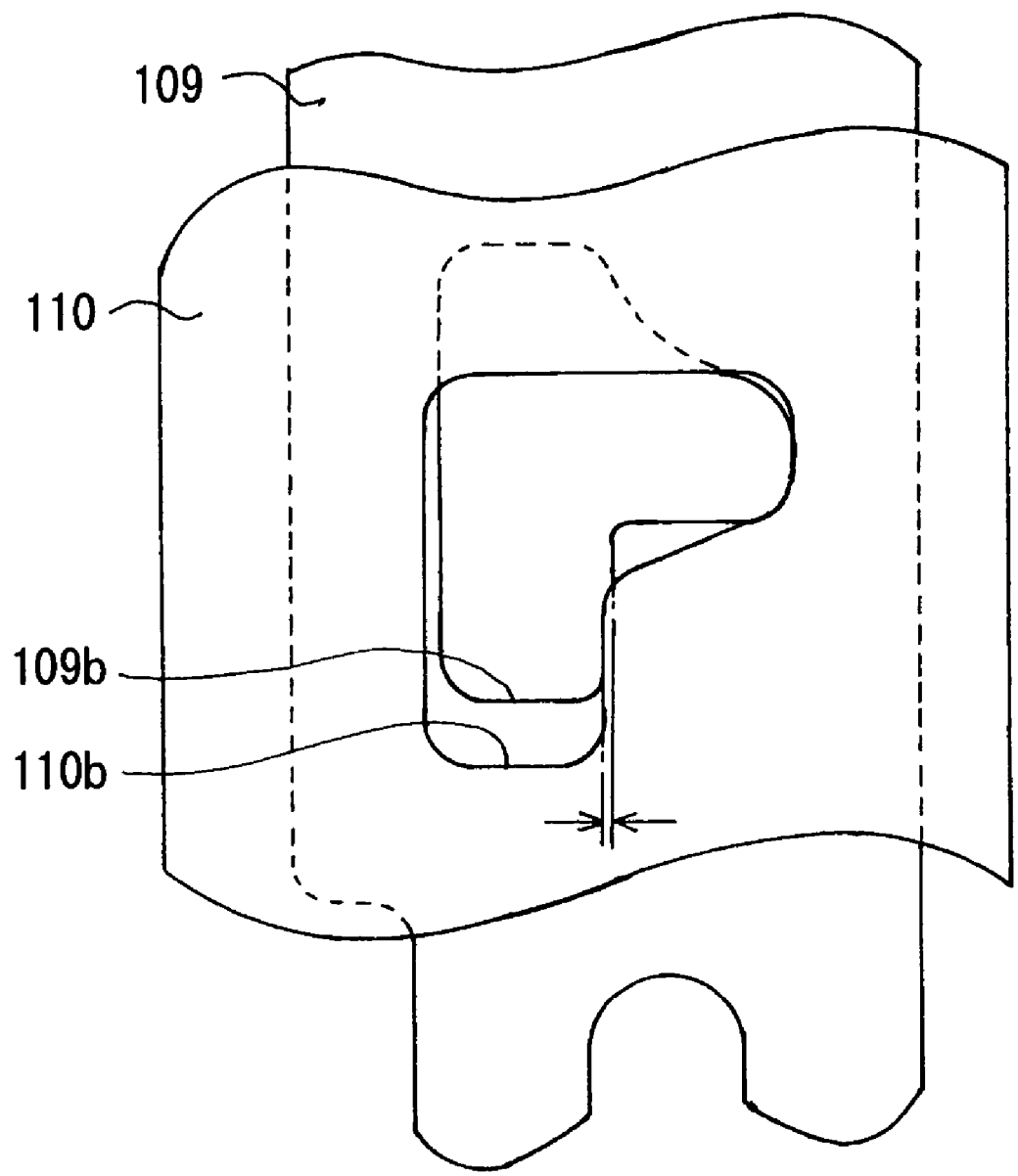
FIG. 4 is a side view of a state of overlapping groove cams of the fixed cam plate and the push plate.

FIG. 3(a) shows the fixed cam plate 110, FIG. 3(b) shows the push plate 109, FIG. 4 shows a state of overlapping the respective groove cams 109b, 110b of the push plate 109 and the fixed cam plate 110, by moving the groove cam 109b of the push plate 109 in an up and down direction relative to the groove cam 110b of the fixed cam plate 110, the pin 114 of the picking plate 108 inserted into the groove cams 109b, 110b is moved in a front and rear direction (left and right direction in FIG. 4) to thereby pivot the picking plate 108 in the front and rear direction by constituting a fulcrum by a lower portion thereof.

Figure 5A:
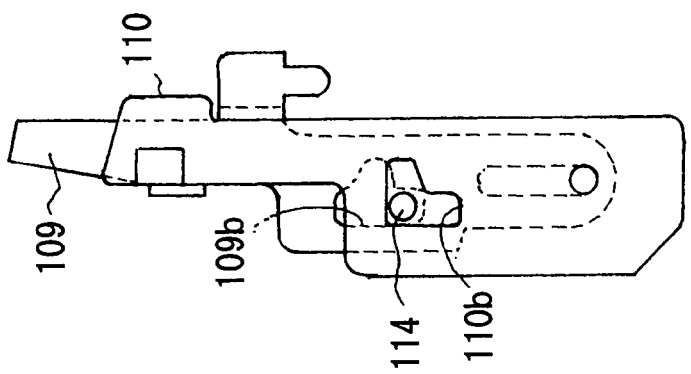
FIGS. 5(a) through 5(h) are operational stroke views of the tape grasping apparatus.

FIG. 5 shows motion of the tape grasping apparatus 107, showing only the pin 114 by omitting illustration of the picking plate 108 and indicating a forward and rearward motion of the picking plate 108 by a position of the pin 114. FIG. 5(a) shows an initial state, the push plate 109 is moved up by the compression coil spring and the pin 114 of the picking plate 108 is brought into a lower end portion of the groove cam 109b of the push plate 109. Therefore, as shown by FIG. 6, the picking plate 108 is disposed at the rear initial position to separate from the tape support plate 111.

Figure 5B:
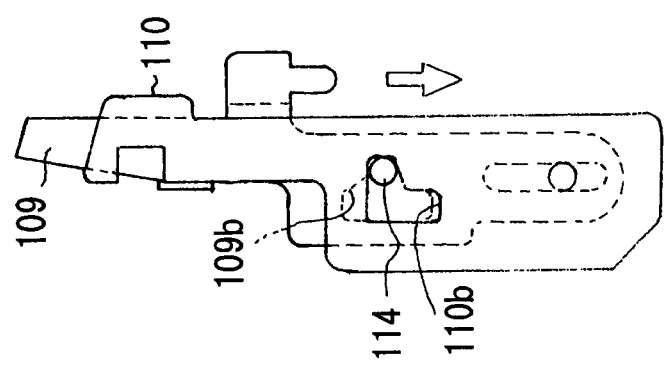
Figure 6:
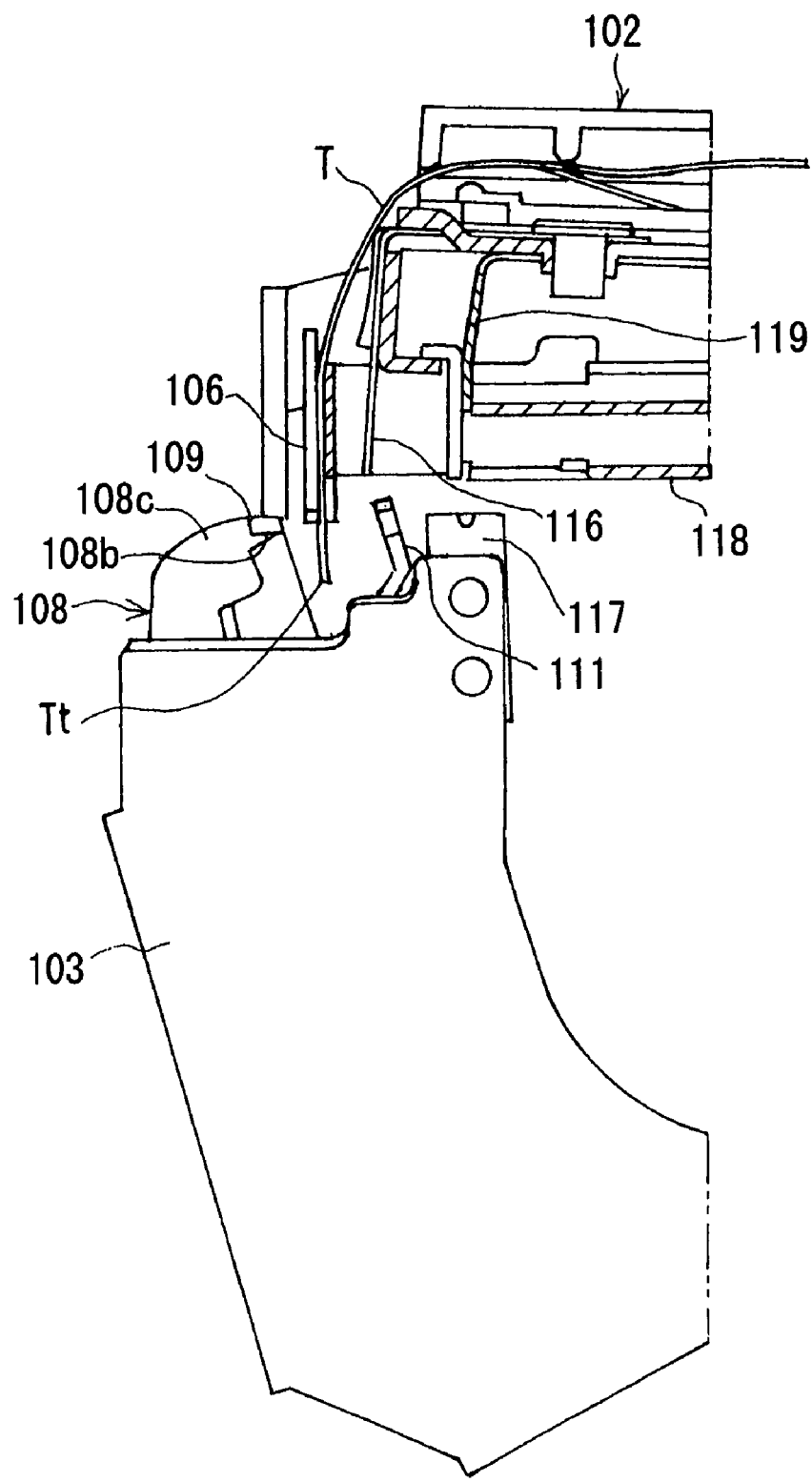
FIG. 6 is a sectional view of a front portion of the gardening binder showing an initial state.
Figure 7:
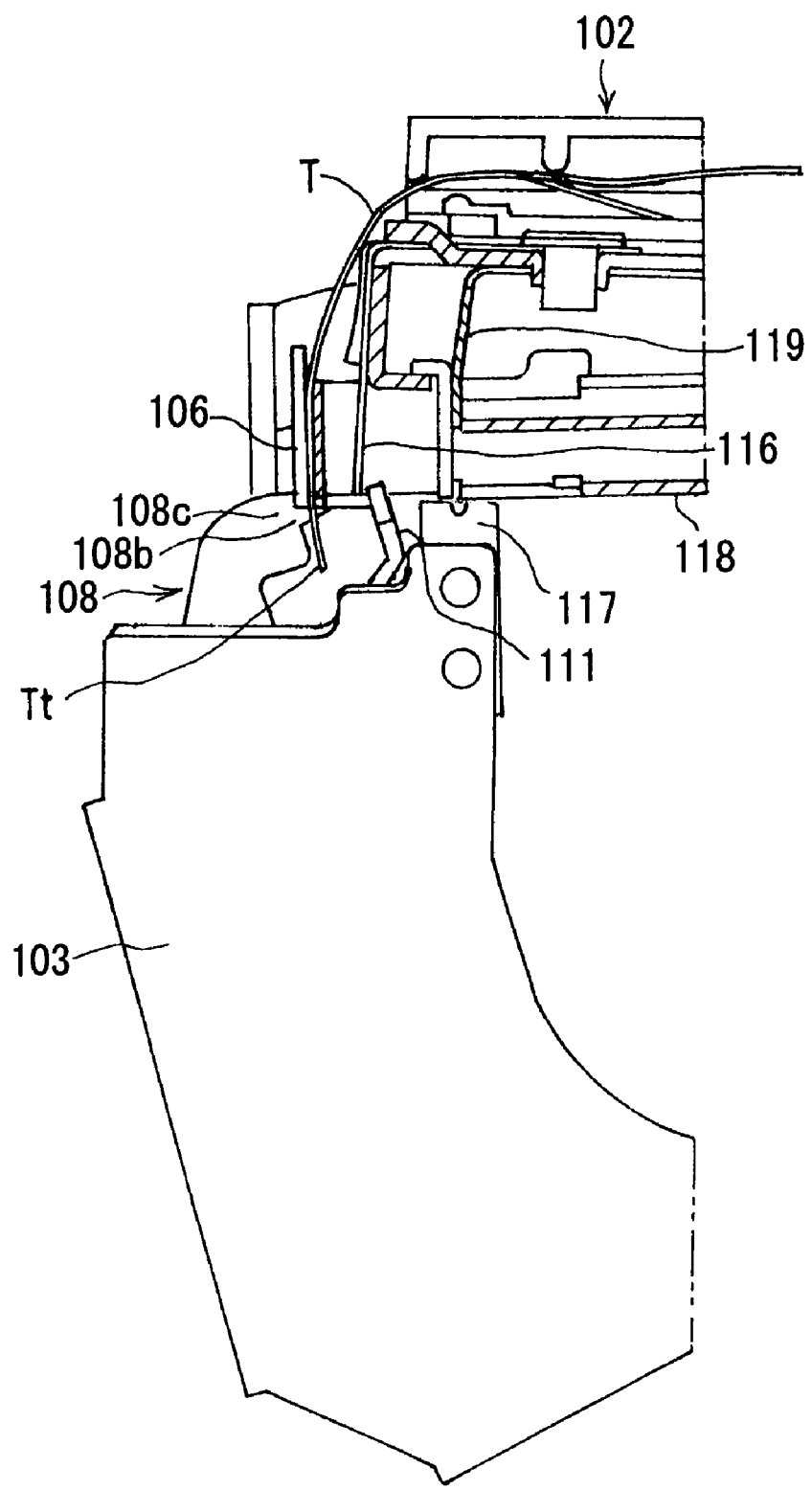
FIG. 7 is a sectional view of the front portion of the gardening binder in picking a tape.

When the push plate 109 is pushed down by one stage by closing the driver handle 102 and the lower handle 104, as shown by FIG. 5(b), a recessed portion of the groove cam 110b of the fixed cam plate 110 and a recessed portion of the groove cam 110b of the push plate 109 coincide with each other and the pin 114 is brought into the recessed portions of the groove cams 109b, 110b by spring force of the torsional coil spring. That is, the upper portion of the picking plate 108 is pivoted to this side, as shown by FIG. 7, the claw 108b of the picking plate 108 is pierced into a front end portion of the tape T which comes out to the lower side from the front end of the tape guide 106, however, the stepped portion 108c above the claw 108b impinges to a front face of the tape guide 106 to thereby stop the picking plate 108. Therefore, the tape T is hardly exerted with a pulling tension and therefore, the tape is not broken.

Figure 8:
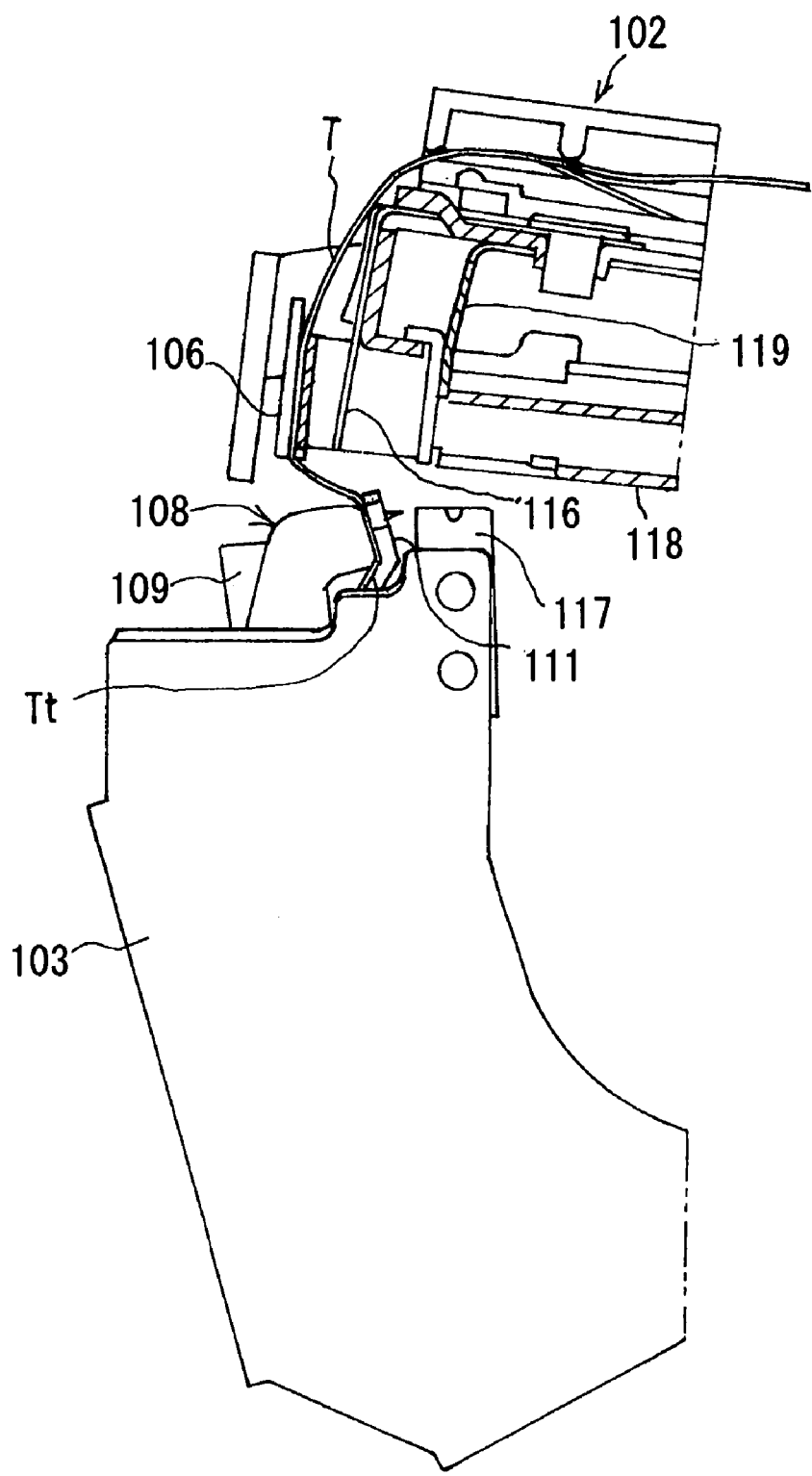
FIG. 8 is a sectional view of the front portion of the gardening binder in grasping the tape.

Further, when the driver handle 102 and the clincher arm 103 are opened by temporarily releasing the handle operation, the stepped portion 108c of the picking plate 108 is detached from the front face of the tape guide 106 and the picking plate 108 is pivoted to this side and as shown by FIG. 8, the front end portion of the tape T is pressed to the tape support plate 111 to be pinched thereby. Successively, when the driver handle 102 and the clincher arm 103 is further opened, the tape T is pulled out from the tape guide 106 to develop between the driver handle 102 and the clincher arm 103.

Figure 5C:
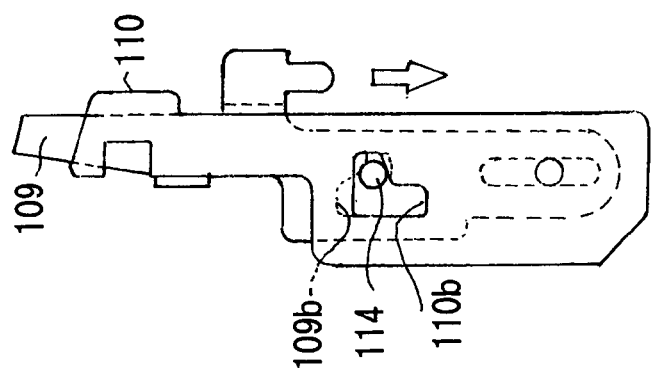
Figure 5D:
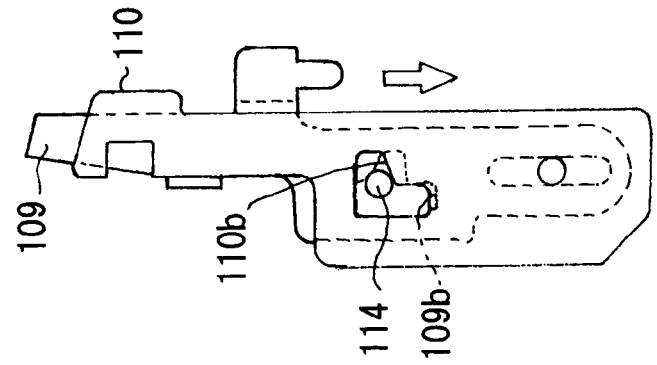

Successively, when the tape between the driver handle 102 and the clincher arm 103 is hung around branches, stays and the like and the upper and lower handles 102 and 103 are strongly grasped, the push plate 109 is pushed down from a middle lock position by the drive handle 102 and as shown by FIGS. 5(c) and 5(d), the pin 114 of the picking plate 108 is regressed by being pushed by an upper inclined face of the groove cam 109b of the push plate 109. This is for avoiding the cutter blade 116 from impinging on the picking plate 108 disposed right below the cutter blade 116. As shown by FIG. 3(b), an angle of inclination of the upper inclined face of the groove cam 109b of the push plate 109 is changed in two stages, as shown by FIG. 5(c), at a former half of regressing operation, the pin 114 is rapidly regressed and at a later half stage shown in FIG. 5(d), the pin 114 is regressed at low speed.

Figure 5E:
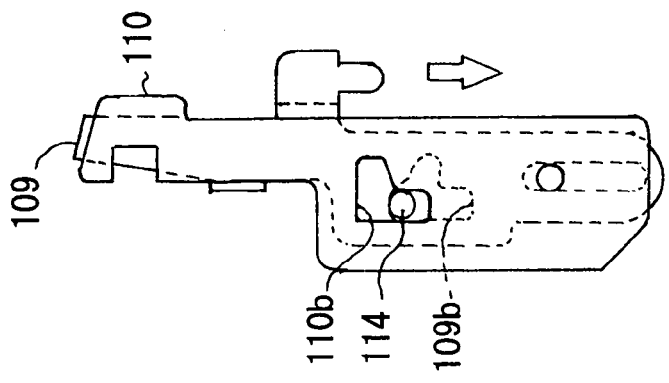
Figure 5F:
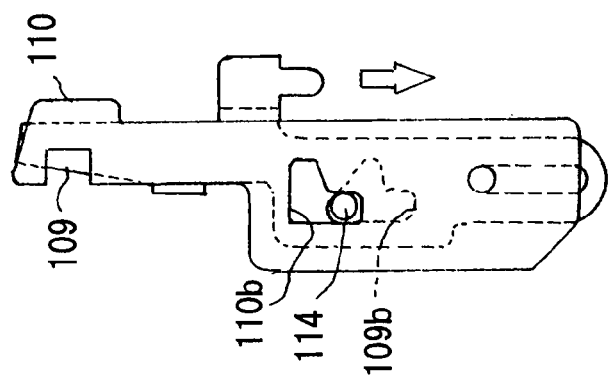
Figure 9:
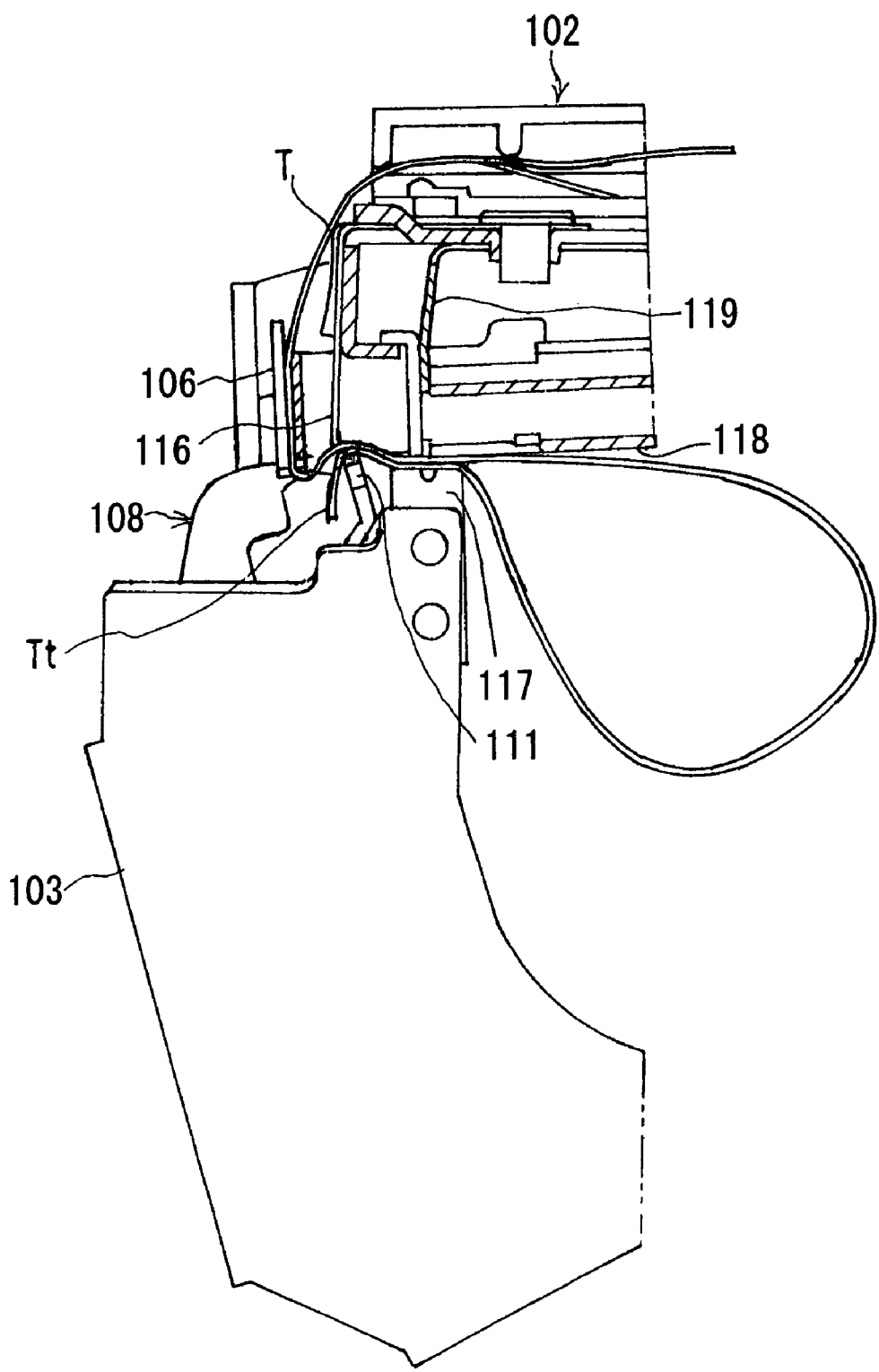
FIG. 9 is a sectional view of the front portion of the gardening binder in forming a tape loop.

At the stage of FIG. 5(c), the picking plate 108 is regressed to a middle position as shown by FIG. 9, at this occasion, the tape T is pinched by the tape guide 106 of the driver handle 102 and the picking plate 108 on the upstream side of the cutter blade 116, on the downstream side of the cutter blade 116, the tape T is pinched by the clincher 117 and the staple magazine 118 and is clamped before and after the cutter blade 116. Further, the rear end of the tape groove is cut by further moving down the cutter blade 116, however, the front end portion Tt of the tape T is not restrained and therefore, the front end portion Tt is escaped from the cutter blade 116 and is not cut. When the staple driver 119 injects a staple (not illustrated) at inside of the staple magazine to close the tape, as shown by FIGS. 5(e) and 5(f), the push plate 109 is moved down while holding the picking plate 108 at a standby position on the rear side.

Figure 5G:
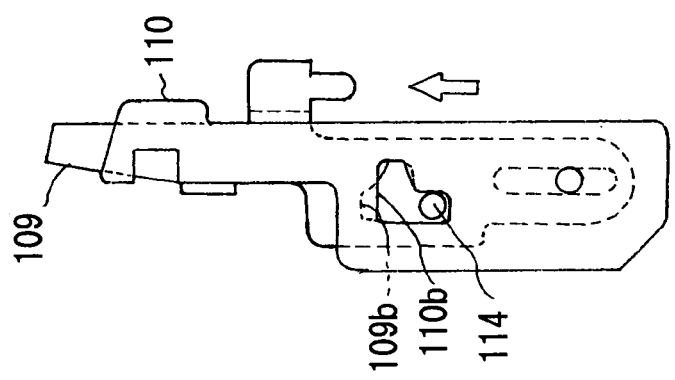
Figure 5H:
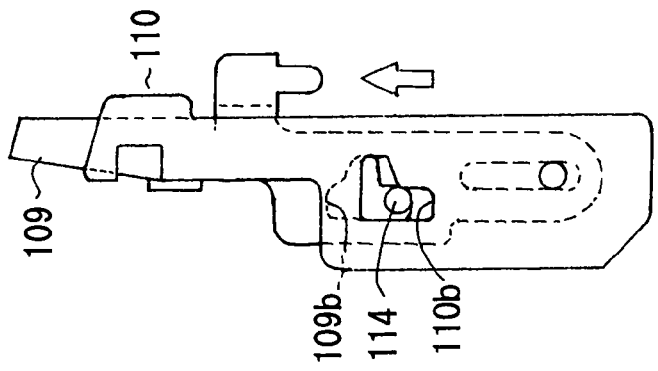

When the upper and lower handles 102, 104 are released from being grasped after striking the staple, the push plate 109 is moved up from the lowest position and as shown by FIGS. 5(g) and 5(h), the lower end of the groove cam 109b of the push plate 109 pushes up the pin 114 of the picking plate 108 and the push plate 109 and the picking plate 108 return to initial positions as shown in FIG. 5(a) and FIG. 6.

Although as described above, an explanation has been given of means for preventing the tape from being broken by restricting movement of the picking plate 108 when the tape is caught by the picking plate 108, a notch having a wide width may be formed at a middle portion in the left and right direction of a plate on this side in two sheets of plates constituting the tape guide 106 and the tape may be prevented from being broken by enabling to absorb impact by bending the tape when the claw 108b of the picking plate 108 impinges on the tape, or both of means may be used.

Figure 10A:
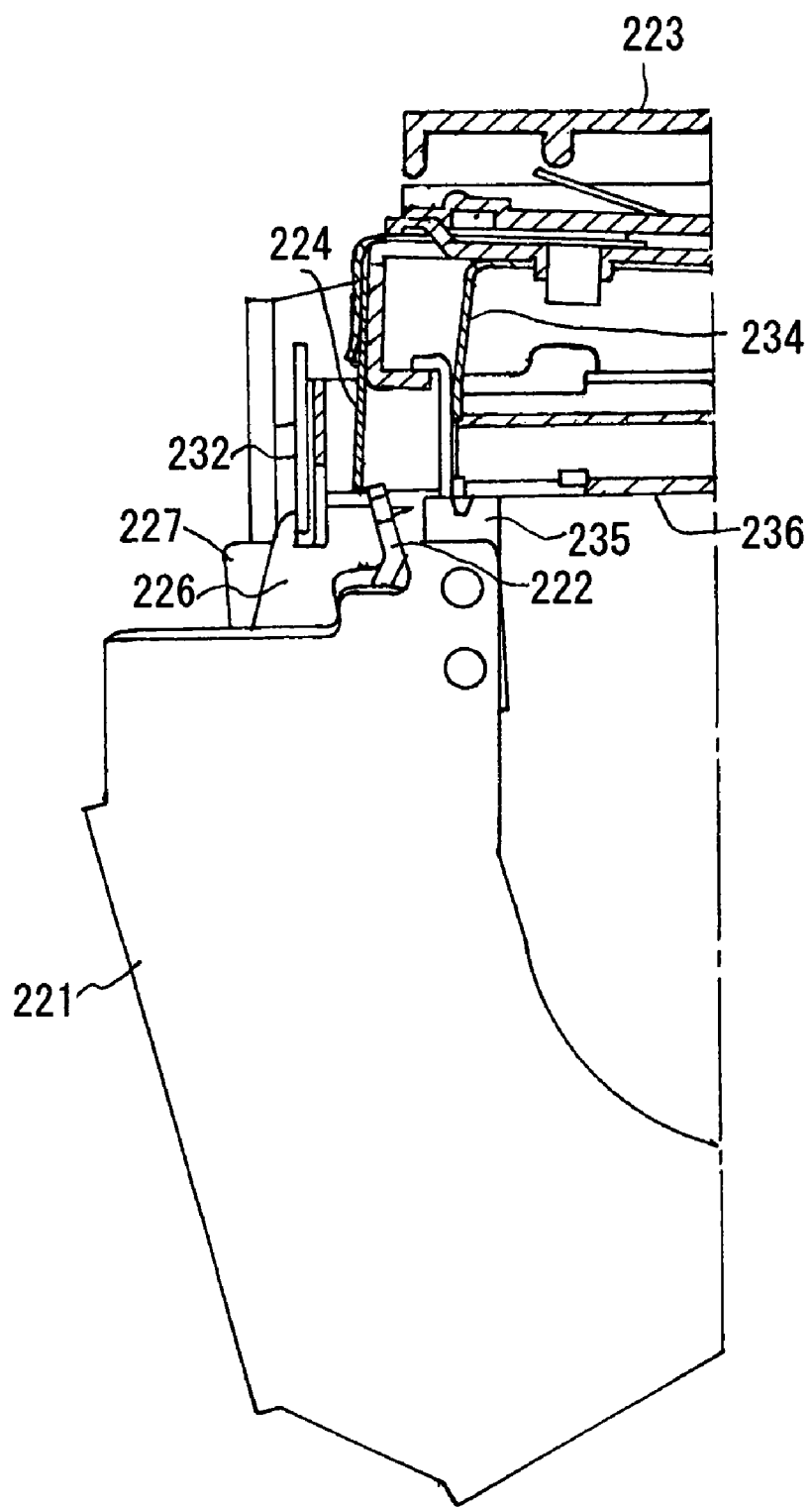
FIGS. 10(a) and 10(b) are sectional views of a front portion of a gardening binder showing a second embodiment of the invention.
Figure 10B:
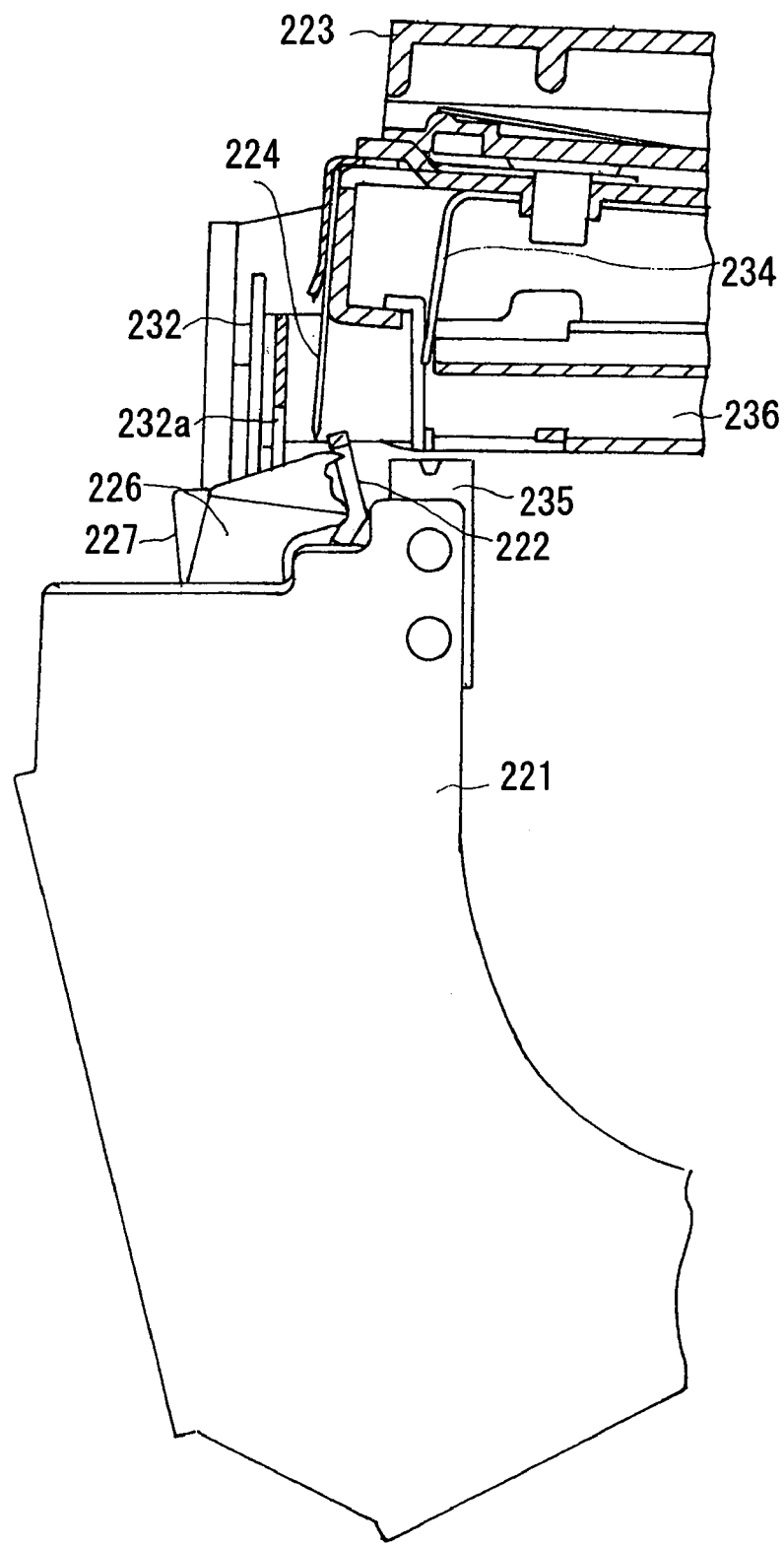

Next, a second embodiment of the invention will be described in details in reference to the drawings. FIGS. 10(a) and 10(b) show a front end portion of a gardening binder, a general constitution thereof is the same as that of a gardening binder of a related art, however, a position of the tape support plate 222 and a constitution of the groove cam of the tape grasping apparatus in the clincher arm 221 differ from those of the related art type and the tape support plate 222 is arranged slightly on this side (right side in the drawing) of the cutter plate 224 attached to the driver handle 223.

Figure 11:
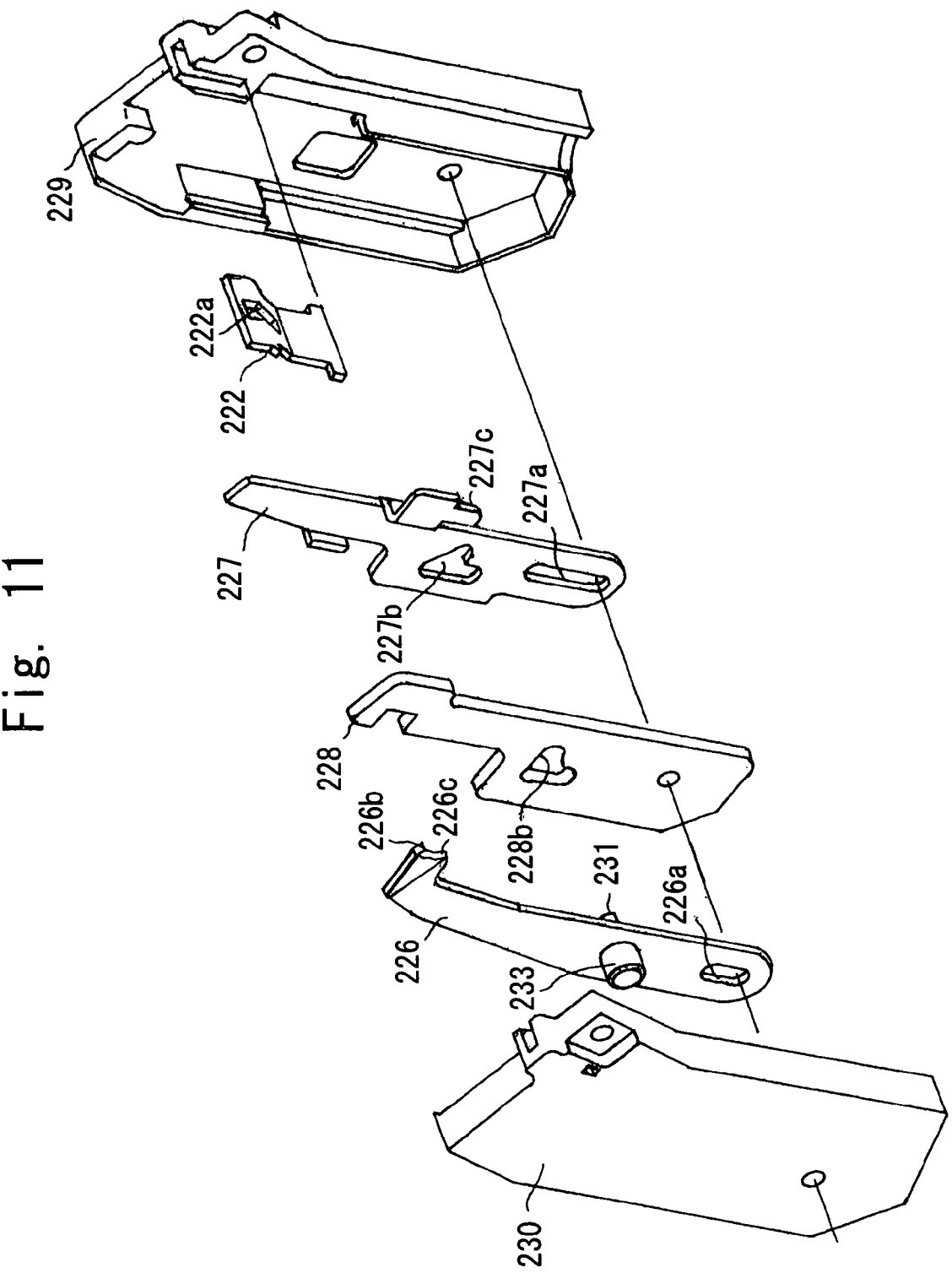
FIG. 11 is a disassembled view of a tape grasping apparatus.

FIG. 11 shows the tape grasping apparatus 225 attached to inside of the clincher arm 221 and the picking plate 226, the push plate 227, the fixed cam plate 228 and the tape support plate 222 are integrated in the cases 229, 230 provided to the left and to the right. A pin (not illustrated) is inserted into rear long holes 226a, 227a of the picking plate 226 and the push plate 227 and a pin 231 provided at a middle portion of the picking plate 226 is inserted into a groove cam 228b of the fixed cam plate 228 and a groove cam 227b of the push plate 227.

An upper end portion of the picking plate 226 is formed with a claw 226b in a wedge shape projected at this side and the rounded type projected portion 226c therebelow and the projected portion 226c operates to push the tape to the tape support plate 222 and operates to prevent the tape from being broken by restricting a penetrated amount of the claw 226b. Further, an interval between the claw 226b and the projected portion 226c is formed by a recessed curved face to constitute a shape of excluding an edgy portion causing to break the tape. The top portion of the picking plate 226 is constituted by an inclined face regressed downwardly to prevent the head portion from being brought into a center groove 232a of the tape guide 232 shown in FIG. 10(b) in a binding and tape cutting step, mentioned later.

As shown by FIG. 11, a center in a left and right direction of the tape support plate 222 is formed with the groove hole 22a prolonged vertically and when the picking plate 226 is pivoted to this side, the claw 226b of the picking plate 226 advances into the groove hole 222a by penetrating the tape and the projected portion 226c pushes the tape to the tape support plate 222 to clamp the tape.

Figure 12:
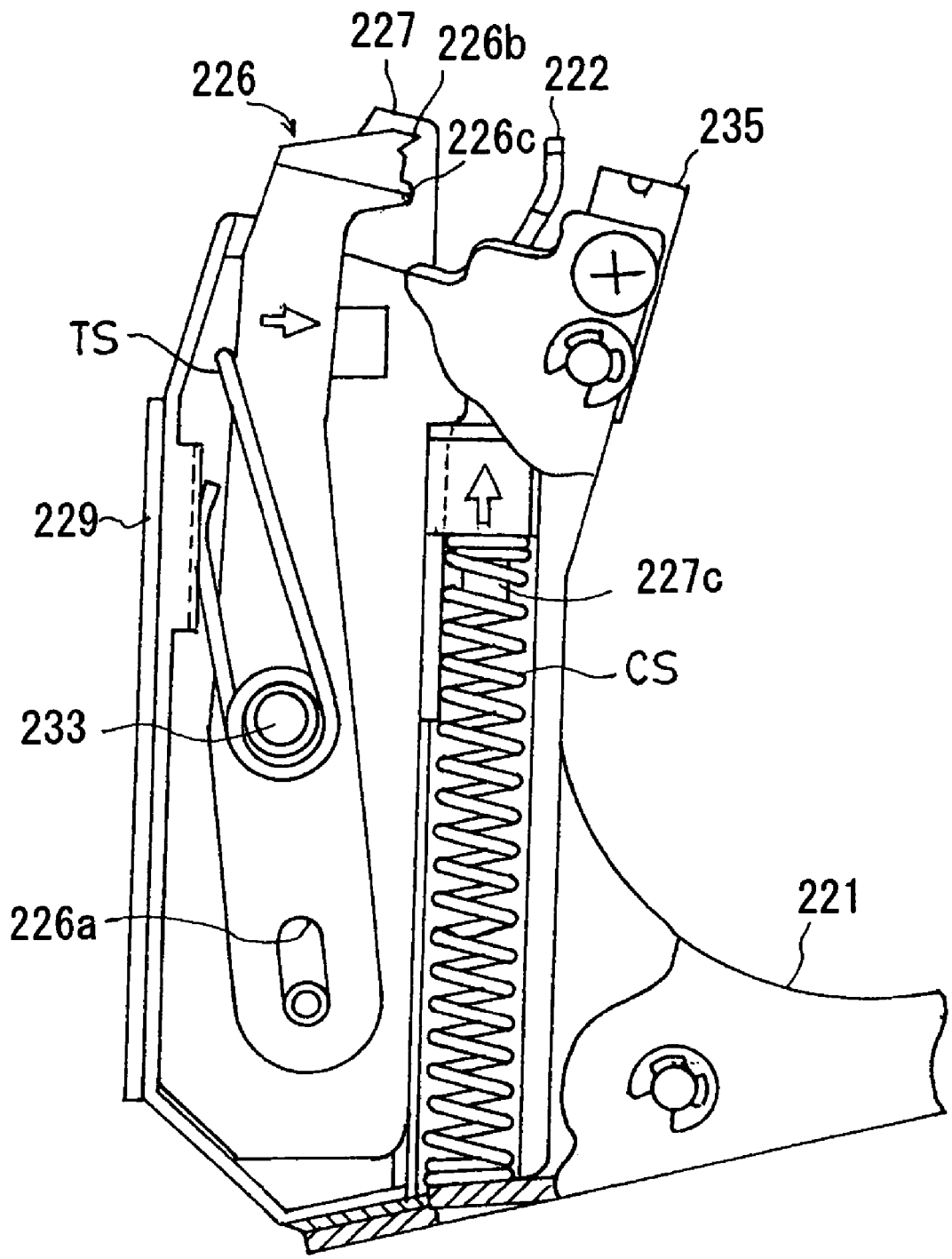
FIG. 12 is a notched side view of a clincher arm.

As shown by FIG. 12, the push plate 227 is integrated into the cases 229, 230 by engaging a compression coil spring CS to the spring receiver 227c at a front portion thereof and also the picking plate 226 is integrated to the cases 229, 230 by attaching a torsional coil spring TS to the shaft 233. The push plate 227 is urged to the upper side by the compression coil spring CS and the picking plate 226 is urged in a direction of pivoting the upper portion to this side (right side in the drawing) by the torsional coil spring TS.

Figure 13B:
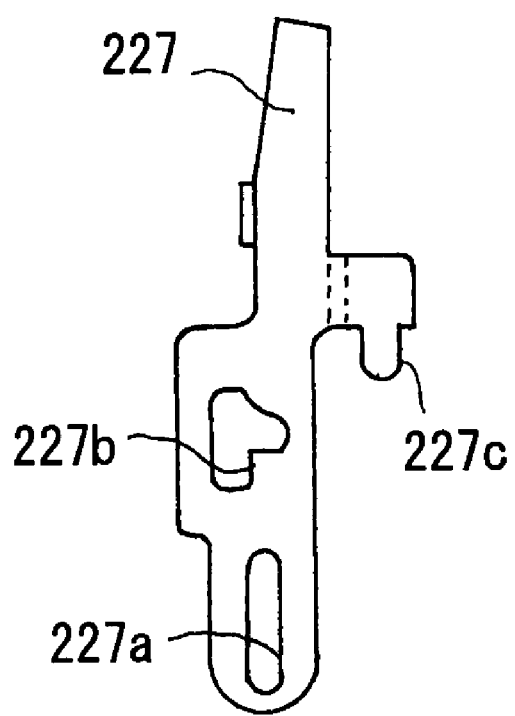
FIG. 13(a) is a side view of a fixed cam plate and FIG. 13(b) is a side view of a push plate.
Figure 13A:
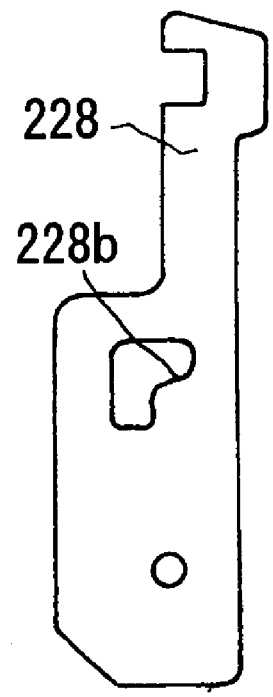
Figure 14:
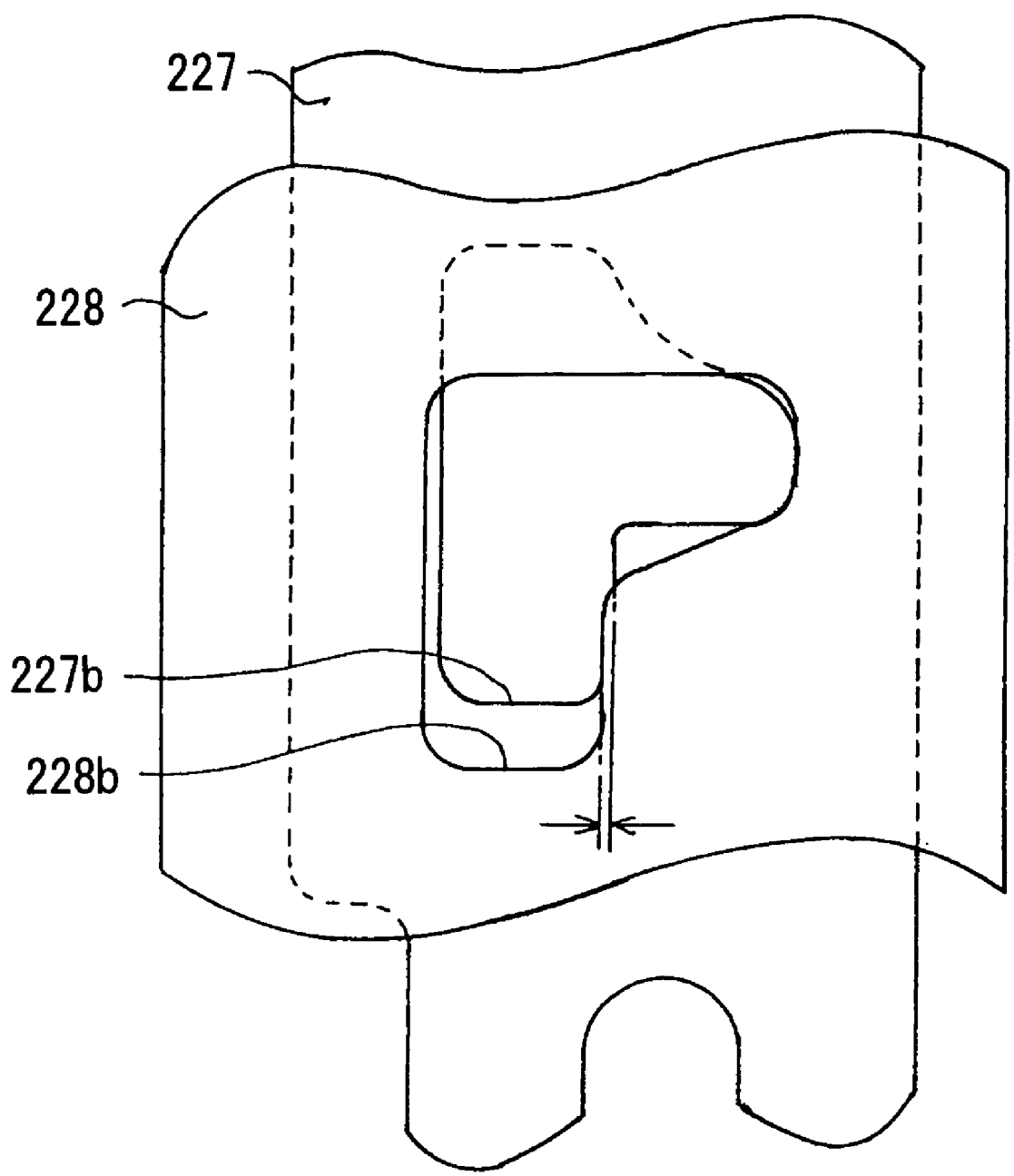
FIG. 14 is a side view of a state of overlapping groove cams of the fixed cam plate and the push plate.

FIG. 13(a) shows the fixed cam plate 228, FIG. 13(b) shows the push plate 227, FIG. 14 shows a state of overlapping the respective groove cams 227b, 228b of the push plate 227 and the fixed cam plate 228 and by moving the groove cam 227b of the push plate 227 in an up and down direction relative to the groove cam 228b of the fixed cam plate 228, the pin 231 of the picking plate 226 inserted into the groove cams 227b, 228b is moved in a left and right direction to thereby pivot the picking plate 226 in a front and rear direction by constituting a fulcrum by a lower portion thereof.

FIGS. 15(a) through 15(h) show motion of the tape grasping apparatus 225, showing only the pin 231 by omitting illustration of the picking plate 226 and indicating motion of the picking plate 226 in the front and rear direction by a position of the pin 231. FIG. 15(a) shows an initial state, the push plate 227 is moved up by the compression coil spring and the pin 231 of the picking plate 226 is brought into a lower end portion of the groove cam 227b of the push plate 227. Therefore, as shown by FIG. 12, the picking plate 226 is disposed at an initial position on the rear side separated from the tape support plate 222.

When the push plate 227 is pushed down by one stage by closing the driver handle 223 and the lower handle (not illustrated), as shown by FIG. 15(b), a recessed portion of the groove cam 228b of the fixed cam plate 228 and a recessed portion of the groove cam 227b of the push plate 227 coincide with each other and the pin 231 is brought into the recessed portions of the groove cams 227b, 228b by spring force of the torsional coil spring. That is, the upper portion of the picking plate 226 is pivoted to this side and as shown by FIG. 10(b), the picking plate 226 is elastically brought into contact with the tape support plate 222 to pinch the front end portion of the tape (not illustrated). Further, by temporarily releasing the handle operation as described above, the tape is extracted from the tape guide 232 and is stretched between the tape guide 232 and the clincher arm 221. At this occasion, the projected portion 226c of the front face of the picking plate 226 pushes the tape to the tape support plate 222 and therefore, the tape is not broken from a bored portion by the claw 226b by pulling tension.

Figure 16A:
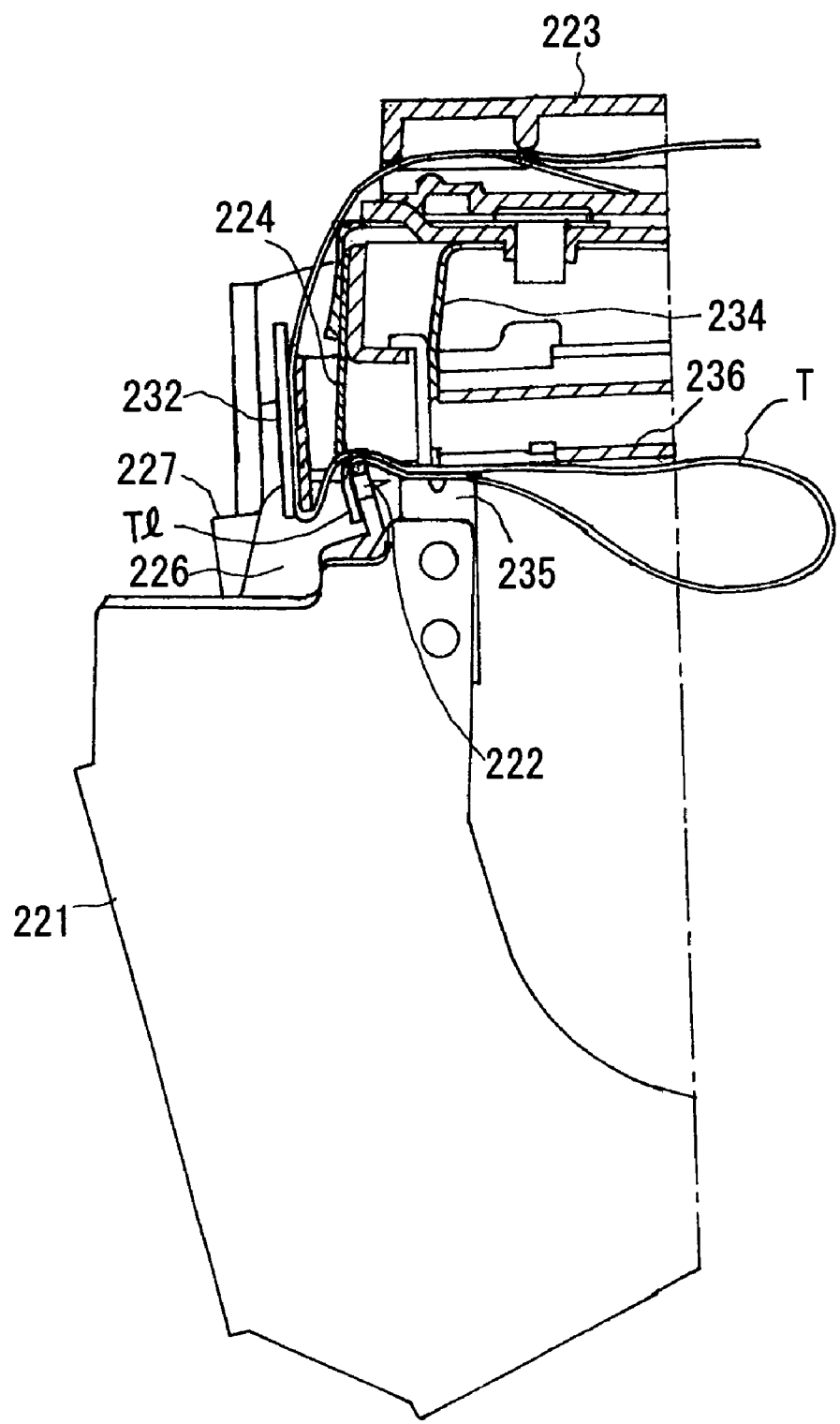
FIGS. 16(a) and 16(b) are sectional views of a front portion of the gardening binder showing a state of forming a tape loop.
Figure 16B:
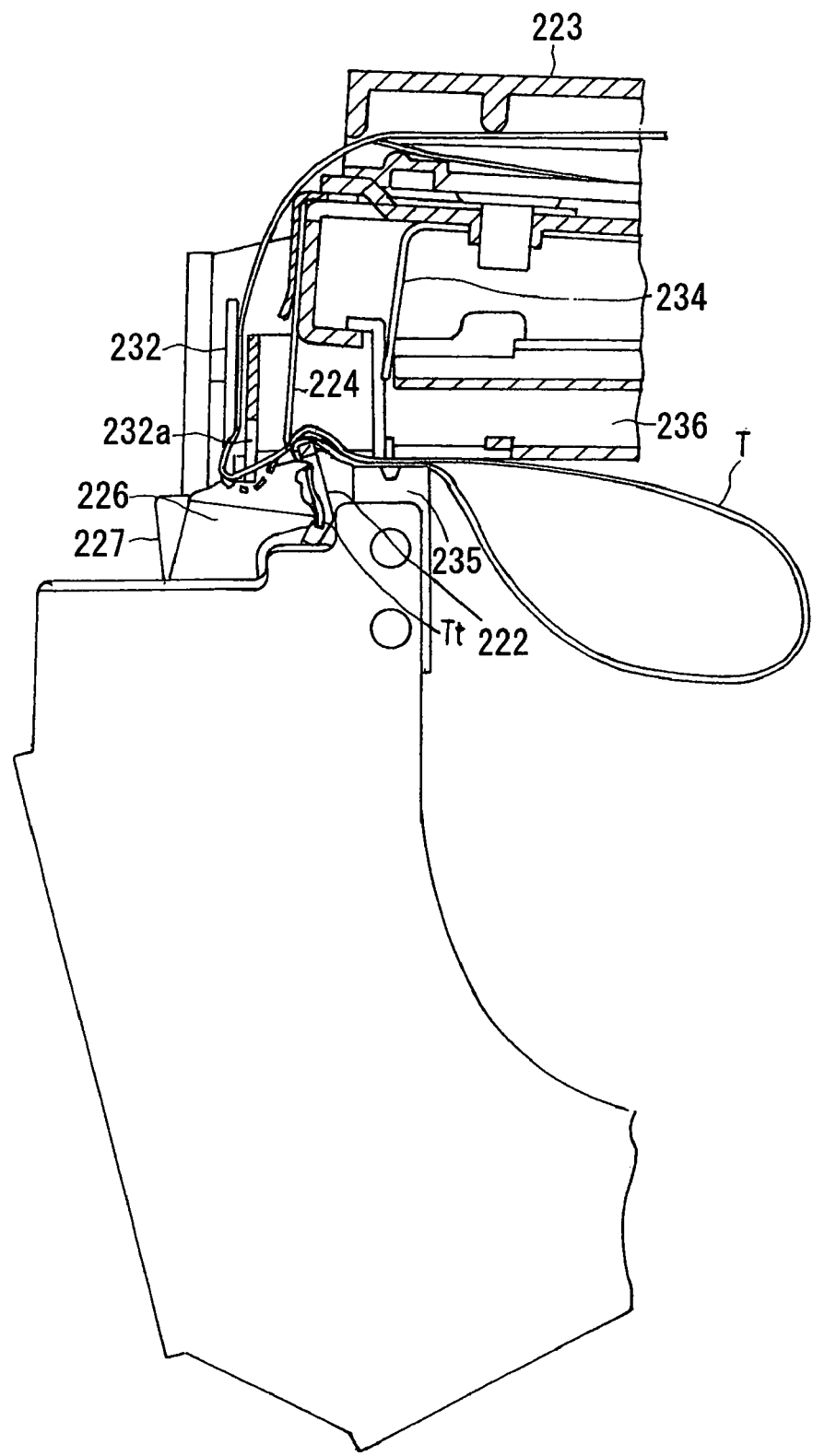

FIG. 16(b) shows a state of grasping the upper and lower handles after hanging the tape between the driver handle 223 and the clincher arm 221 around branches, stays and the like, when the handle is strongly grasped further from the state, the push plate 227 is pushed downs from a middle locking position and as shown by FIGS. 15(c) and 15(d), the pin 231 of the picking plate 226 is regressed by being pushed by an upper inclined face of the groove cam 227b of the push plate 227. As shown by FIG. 16(b), this is for avoiding the cutter blade 224 from impinging on the picking plate 226 disposed right below the cutter blade 224 and as shown by FIG. 13(b), an angle of inclination of the upper inclined face of the groove cam 227b of the push plate 227 is changed in two stages, as shown by FIG. 15(c), at a former half of regressing motion, the pin 231 is regressed rapidly and at a stage of a later half shown in FIG. 15(d), the pin 231 is regressed at a lower speed.

Figure 17A:
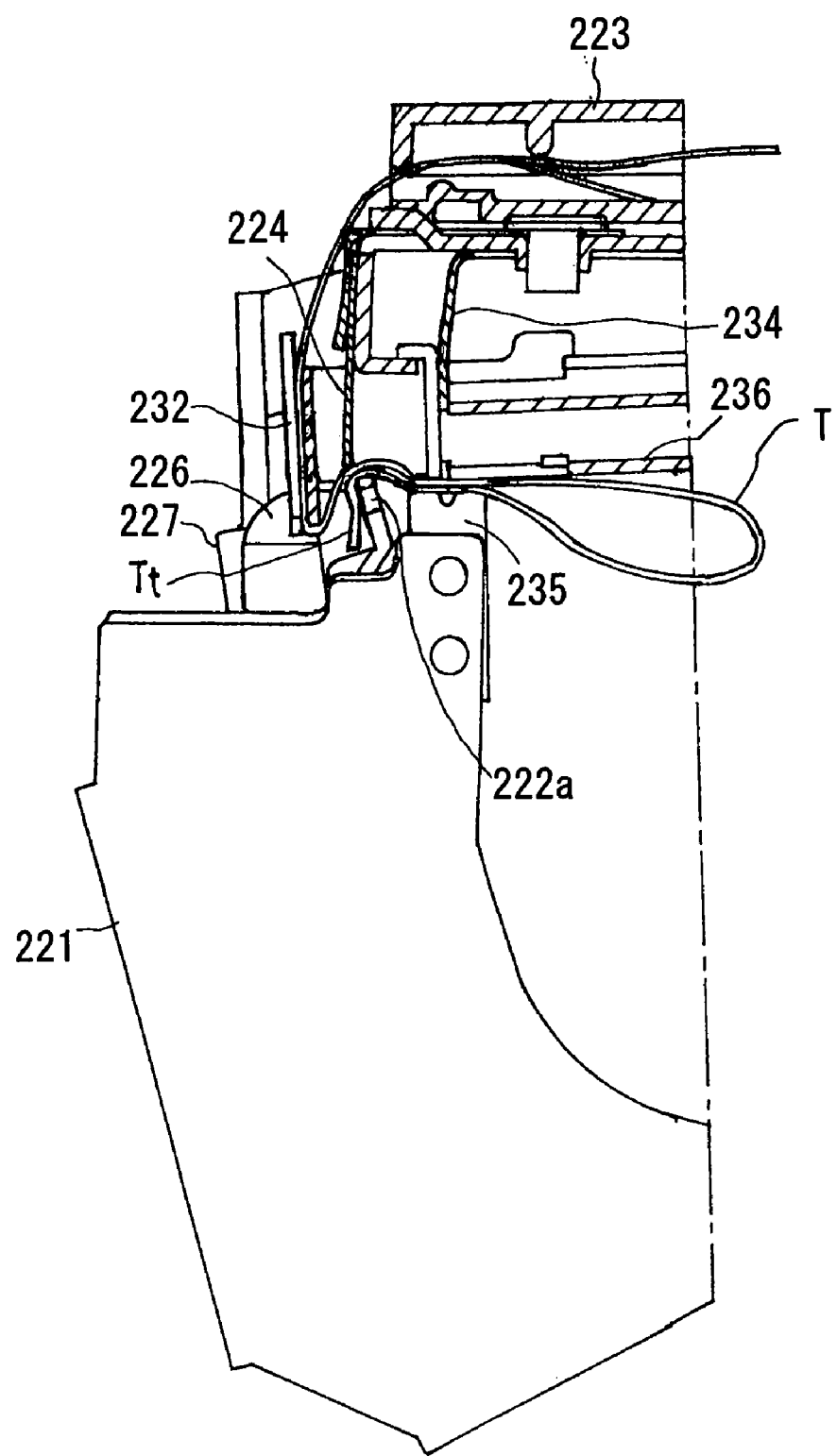
FIG. 17 (a) is a side view of a gardening binder showing other example of the second embodiment.
FIG. 17(b) is a sectional view of a front portion of the gardening binder in cutting a tape.
Figure 17B:
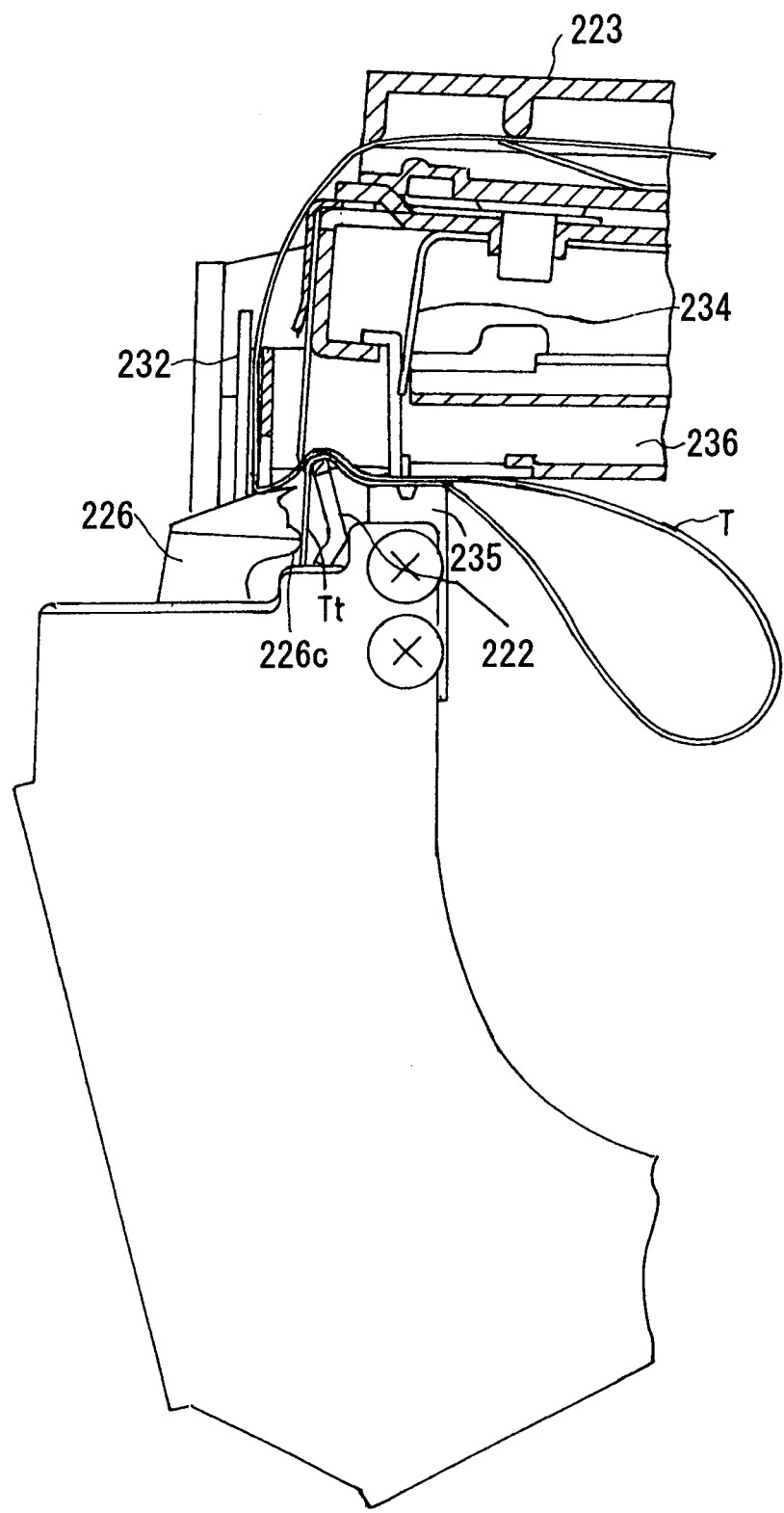

FIG. 17(b) shows a position of the picking plate 226 at the stage of FIG. 15(d), when the cutter blade 224 cuts the rear end of the staple loop, the front end portion Tt of the tape T is held at the position deviated from a path of the cutter blade 224 by the projected position 226c of the picking plate 226 and therefore, the front end portion Tt is not cut and after cutting the rear end of the tape loop by the cutter blade 224, the picking plate 226 is regressed to the initial position (stroke of FIG. 15(e)). Further, when the staple driver 234 of the driver handle 223 injects the staple to close the tape, as shown by FIG. 15(f), the push plate 227 is moved down while maintaining the picking plate 226 at the initial position.

In the above-described series of strokes, as shown by FIG. 16(b) and FIG. 17(b), the tape is pushed to the tape guide 132 by the head portion of the picking plate 226 on the upstream side of the cutter blade 224 and is pinched by the clincher 235 and the staple magazine 236 on the downstream side of the cutter blade 124, further, the top portion of the picking plate 226 is constituted by a shape which is not brought into the center groove 232a of the shape guide 232 and therefore, the center portion of the tape is not deformed in an inverse-V like shape and the cutter blade 224 is uniformly brought into contact with the tape to firmly cut the tape.

When the upper and the lower handles are released from being grasped after striking the staple, the push plate 227 is moved up from the lowest position and as shown by FIGS. 15(g) and 15(h), a lower end of the groove cam 227b of the push plate 227 pushes the pin 231 of the picking plate 226 and the push plate 227 and the picking plate 226 return to initial positions as shown bin FIG. 15(a).

Next, an explanation will be given of the motion of the gardening binder according the embodiment from other view point as follows. When the staple driver 234 of the driver handle 223 injects the staple to close the tape, as shown by FIGS. 15(e) and 15(f), the push plate 227 is moved down while holding the picking plate 226 at a standby position of the rear side and the cutter blade 224 of the driver handle 223 is moved down along a back face of the tape support plate 222 to cut the tape T. At this occasion, the tape is pinched by the tape guide 232 disposed at the front end of the driver handle 223 and the picking plate 226 (the head portion of the picking plate 226 is brought into a groove formed at the center of the tape guide 232 to press the tape, on the downstream side of the cutter blade 224, the tape is pinched by the clincher 235 and the staple magazine 236 and is clamped on front and rear sides of the cutter blade 224 and therefore, the tape is firmly cut. Further, the picking plate 226 is separated from the tape support plate 222 and therefore, the front end portion Tt of the tape T is not restrained and is pressed by the cutter blade 224 to escape to the lower side and therefore, the front end portion Tt is not cut.

According to the gardening binder of the related art, the front end portion of the tape loop is also cut simultaneously and therefore, the front end portion of the tape remains at the tape support plate, however, the gardening binder 201 of the invention cuts only the rear end of the tape loop and therefore, the residue of the tape is not brought about. Further, when the upper and the lower handles are released from being grasped after striking the staple, the push plate 227 is moved up from the lowest position and as shown by FIGS. 15(g) and 15(h), the lower end of the groove cam 227b of the push plate 227 pushes the pin 231 of the picking plate 226 and the push plate 227 and the picking plate 226 return to the initial positions as shown in FIG. 15(a).

Further, when an explanation is supplemented to the shape of the grove cam 228b of the fixed cam plate 228, as shown by FIG. 13(a), by constituting a lower side face of the recessed portion of the groove cam 228 by an inclined face, operational load in pushing down the push plate is reduced. Further, as shown by FIG. 14, a lower linear portion of the groove cam 228b of the fixed cam plate 228 is displaced to the front side more than a lower linear portion of the groove cam 227b of the push plate 227 to prevent a corner of the recessed portion of the groove cam 227b of the push plate 227 and the pin 231 from being brought into contact with each other when the push plate 227 is moved up. This is because when the pin 231 is brought into contact with the corner of the recessed portion of the groove cam 227b of the push plate 227, the pin 231 is pushed up at an early stage, in the midst of the returning stroke shown in FIG. 15(g), the pin 231 is brought into the recessed portion of the groove cam 228b of the fixed cam plate 228 and the picking plate 226 cannot be returned to the initial position and the above-described unstable operation is prevented by preventing the pin 231 from being brought into contact with the wall face on this side of the lower inner portion of the groove cam 227b of the push plate 227.

Further, the invention is not limited to the above-described embodiment but can variously be modified within the technical range of the invention such that, for example, as shown by FIG. 17(a), the front end of the upper claw portion of the picking plate 226 is constituted by a rounded shape to be constituted to press the tape T to the groove hole 226a of the tape support plate 222 to hold without piercing the tape T and the invention is naturally extended to the modified embodiments.

Next, an explanation will be given of a background of a third embodiment of the invention.

According to the gardening binder in the above-described embodiment, the position of the tape support plate and the path of pivoting the cutter blade are reversed in the front and rear direction from those of the related art and residue is prevented from being brought about by preventing the tape front end portion from being cut from the tape loop. According to such a gardening binder, a cam mechanism is constituted such that the path of the cutter blade is set such that the cutter blade passes between the picking plate and the tape support plate overlapping to pinch the tape and when the cutter blade approaches the tape, the picking plate is escaped from the path of the cutter blade, the front end of the tape is released from being held immediately before cutting the tape and the front end portion of the tape is escaped by being pushed by the cutter blade to thereby prevent the front end portion of the tape from being cut.

However, when the cutter blade approaches the tape, the picking plate is separated from the tape support plate and the front end of the tape is released from being held and therefore, depending on a soft degree of the tape, there is a case in which the front end portion is projected to the path of the cutter blade by its own recovery force to thereby cut the front end portion and particularly, in the case of a thick tape or in cold season in which the softness of the tape is deteriorated, the front end portion may be cut.

Further, other than these, in order to firmly cut the tape, it is necessary to bring about a state in which the tape is pressed on front and rear sides of the cutter blade to stretch the tape without the slack, however, since a thin tape is easy to elongate, particularly, under high temperature, the tape is escaped between the cutter blade and the tape support plate and the failure in cutting may be brought about.

The third embodiment of the invention is devised with a principal object of effectively preventing tape scraps from being brought about and a failure in cutting.

Figure 18:
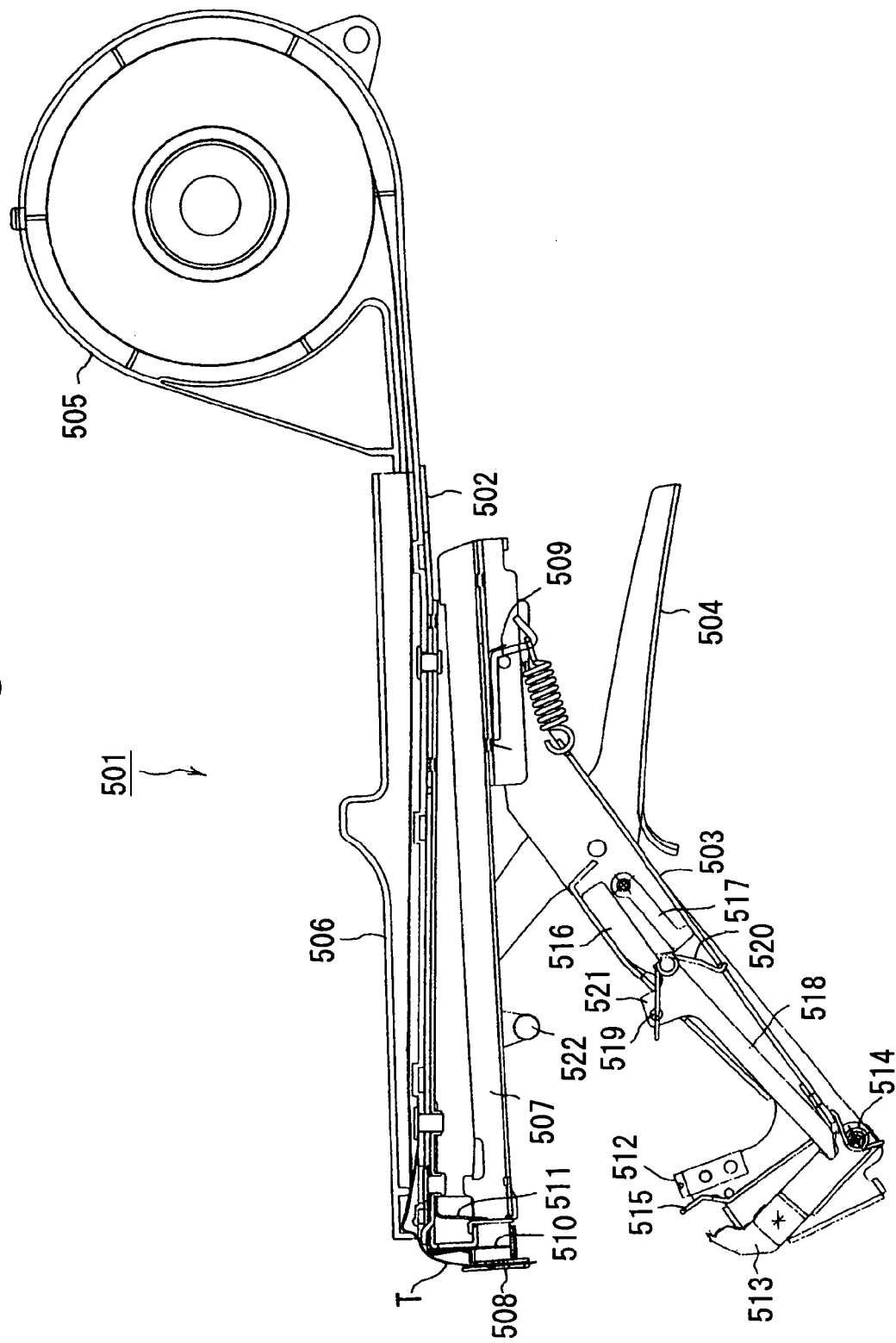
FIG. 18 is a side sectional view of a gardening binder showing a third embodiment of the invention.

The third embodiment will be described in details in reference to the drawings as follows. FIG. 18 shows the gardening binder 501, the drive handle 502, the clincher arm 503 and the lower handle 504 are combined in a shape of a plier, the tape magazine 505 is attached to a rear portion of the driver handle 502, the tape T for gardening charged into the tape magazine 505 is extracted from the front end of the tape guide 406 by passing the tape T through inside of the tape guide 506 mounted to the upper face of the driver handle 502 and passing the tape through the vertical tape guide 508 at the front end of the staple magazine 507 to hang down to the lower side. The driver handle 502 and the staple magazine 507 are connected by a shaft 509 at rear portions thereof and the staple magazine 507 is made to be rotatable in a small angular range relative to the driver handle 502 similar to an ordinary stapler. A front end of the driver handle 502 is attached with the cutter blade 510 in a shape of a notched blade and the plate-like driver 511 for injecting the staple is attached to slightly rear side of the cutter blade 510.

Figure 19:
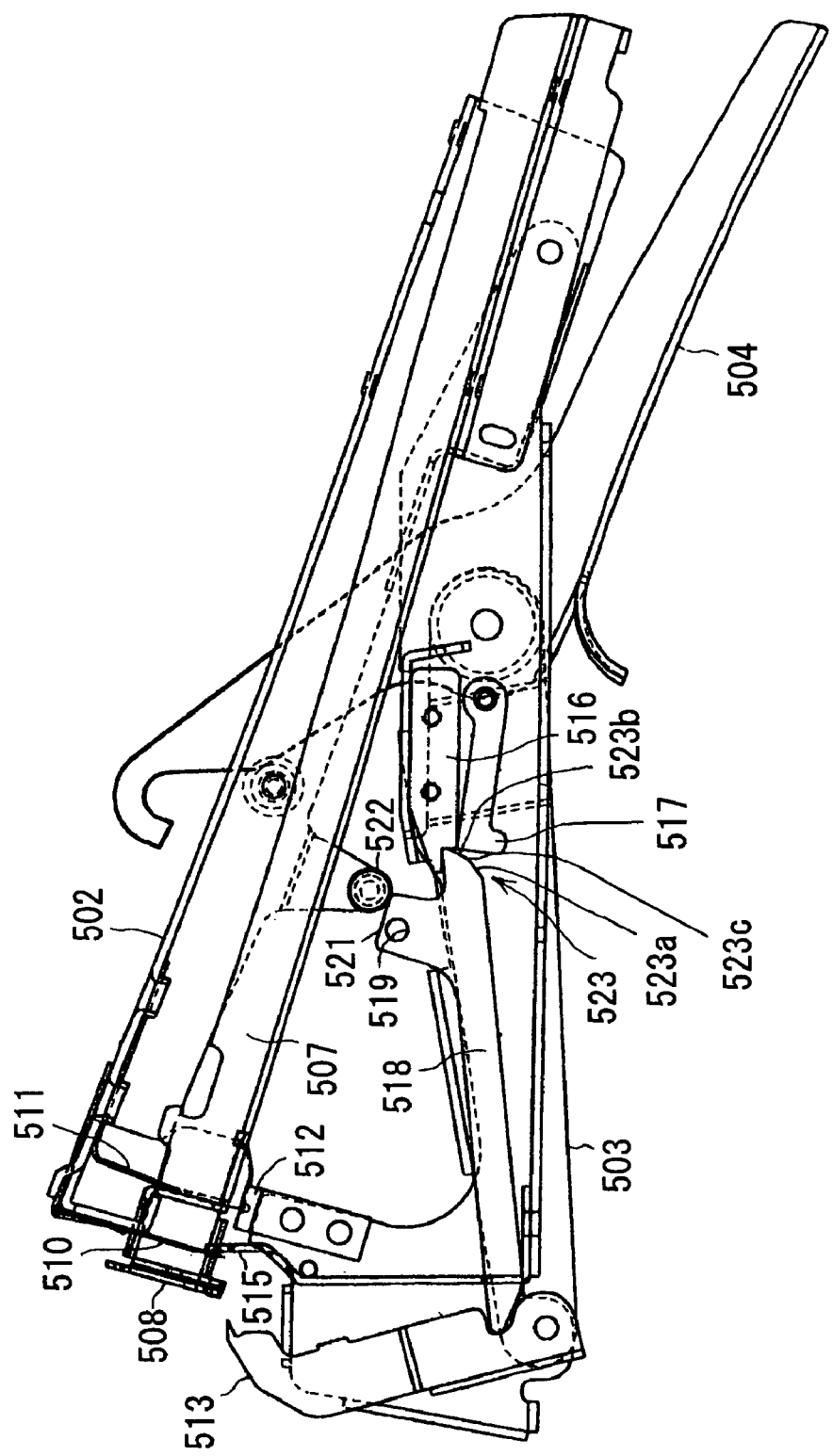
FIG. 19 is a side sectional view showing an operational step of the gardening binder.

Next, a constitution on the side of the clincher arm 503 will be explained. FIG. 19 omits to illustrate staple magazine 505 and the tape guide 506, showing a state in which the driver handle 502 and the clincher arm 503 are lightly closed by grasping the driver handle 502 and the lower handle 504. At this occasion, the clincher 512 provided at a front end portion of the clincher arm 503 and a lower face of a front end portion of the staple magazine 507 are brought into contact with each other and the clincher 512 and the driver 511 are opposed to each other. Further, the front end of the cutter blade 510 is moved down more than an upper end of the tape support plate 515.

The frontwardly and rearwardly pivotable picking plate 513 attached to a front portion of the clincher arm 503 is urged to a side of a pivoting axis (right side in the drawing) of the gardening binder 501 by the torsional coil spring 514 shown in FIG. 18 and is opposed to the tape support plate 505 arranged on this side as shown by FIG. 19. The stopper 516 is fixed at a vicinity of a base portion of the clincher arm 503 and the upwardly and downwardly pivotable clutch lever 117 is attached to the lower side of the stopper 516. The push plate 518 prolonged in the front and rear direction is inserted between the picking plate 513 and the stopper 516 and as shown by FIG. 18, the push plate 518 is urged in an elevating direction by the torsional coil spring 520 interposed between a spring receive hole 119 at the rear portion and a bottom face of the clincher arm 503.

As shown by FIG. 19, a front end portion of the push plate 518 is engaged with a recessed portion of a front face of the picking plate 513 and a rear end thereof is brought into press contact with a front face of the stopper 516 by being pressed by the picking plate 513. A rear portion of the push plate 518 is formed with the projected portion 521 raised to the upper side and the projected portion 521 is made to be adjacent to or brought into contact with the roller 522 provided at the driver handle 502.

Figure 20:
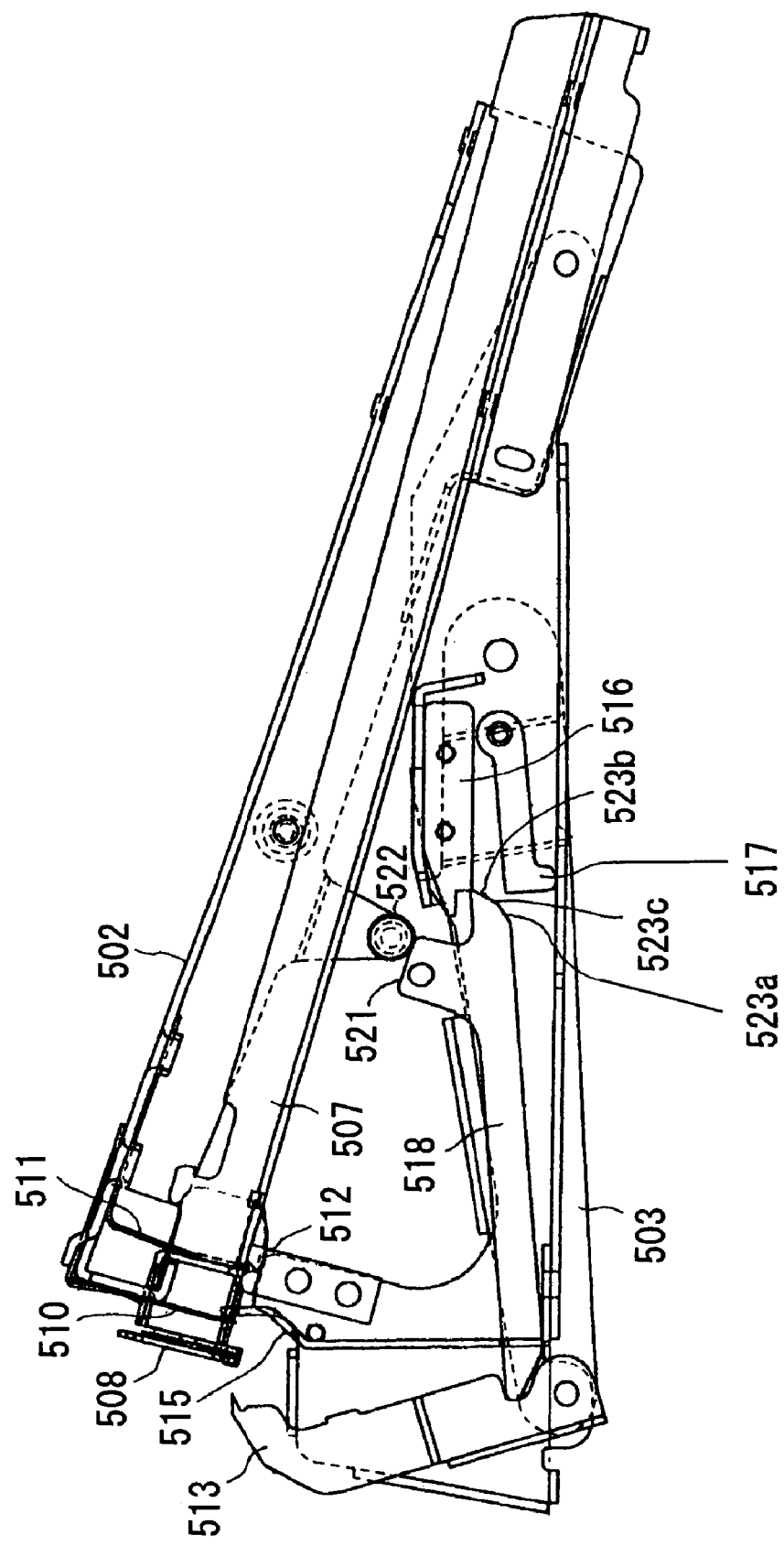
FIG. 20 is a side sectional view showing an operational step of the gardening binder.
Figure 21:
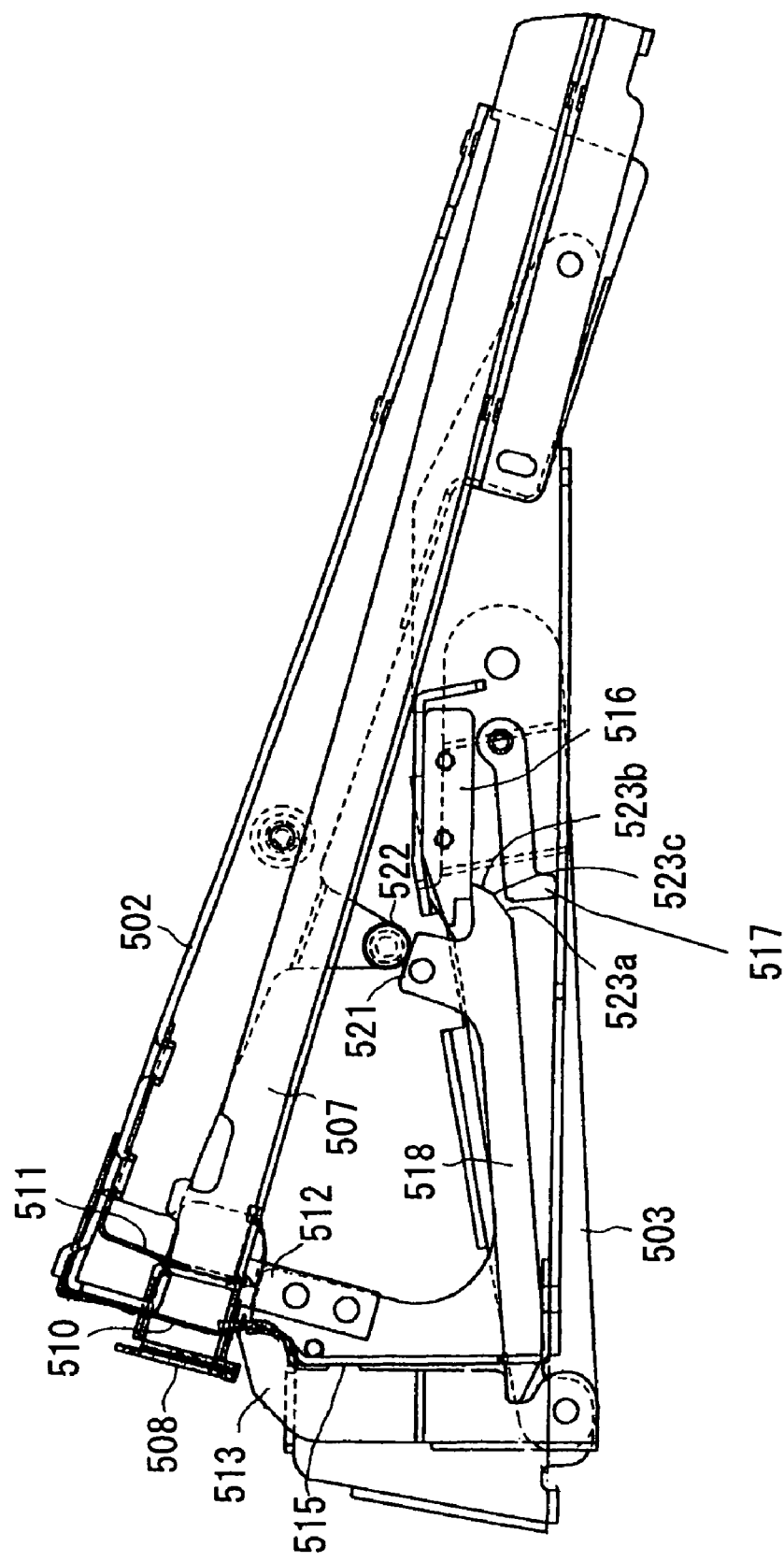
FIG. 21 is a side sectional view showing an operational step of the gardening binder.

When the driver handle 502 and the clincher arm 503 are further closed from a state of FIG. 19, as shown by FIG. 20, the push plate 518 is moved down by being pressed by the roller 522, and as shown by FIG. 21, engagement between the push plate 518 and the stopper 516 is disengaged and the push plate 518 is regressed by being pressed by the picking plate 513. The picking plate 513 is pivoted to the tape support plate 515 and pierces into the front end portion of the tape (not illustrated) hung down to the lower side from the vertical tape guide 508 at the front face of the staple magazine and is brought into contact with the tape support plate 515 to hold the front end of the tape. When the driver handle 502 and the clincher arm 503 are opened by releasing operation of closing the driver handle 502 and the lower handle 504 from the state, the tape is exerted from the side of the driver handle 502 and the tape is stretched between the driver handle 502 and the clincher arm 503. Further, when the gardening binder 501 is pushed out to the front side and stays, branches and the like are brought between the driver handle 502 and the clincher arm 503, the tape is hung around stays and branches and the like.

Successively, when the state of FIG. 21 is produced again by closing the driver handle 502 and the clincher arm 503, the front end portion of the tape (not illustrated) grasped by the tape support plate 515 is overlapped to a downstream portion of the tape at a vicinity of an outlet of the vertical tape guide 508 to form the tape loop. Further, when an interval between the driver handle 502 and the clincher arm 503 is further narrowed, as shown by FIG. 22, the driver 511 is butted to the staple at inside of the staple magazine 507 to start injection and the cutter blade 510 is brought into press contact with the tape on the side of the front face of the tape support plate 515 to start cutting.

Figure 23:
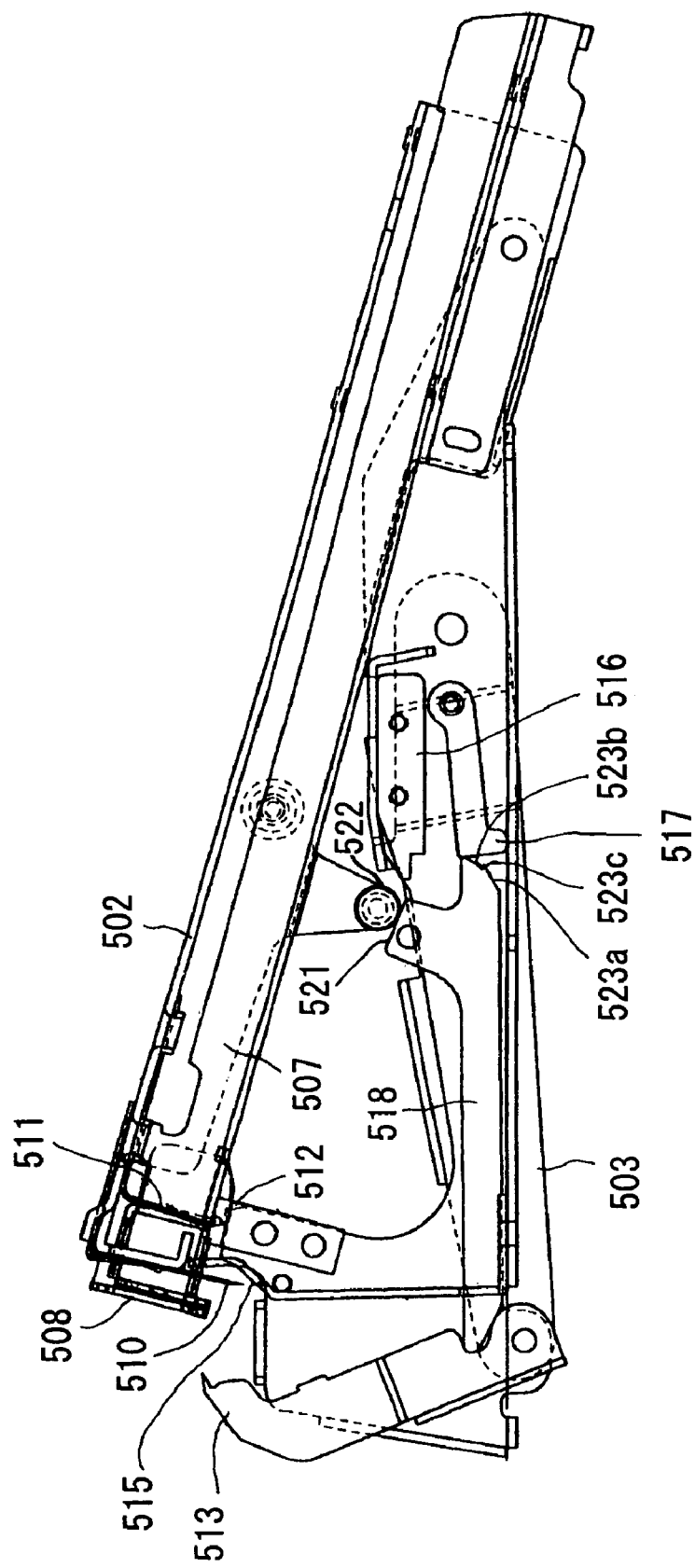
FIG. 23 is a side sectional view showing an operational step of the gardening binder.
Figure 24:
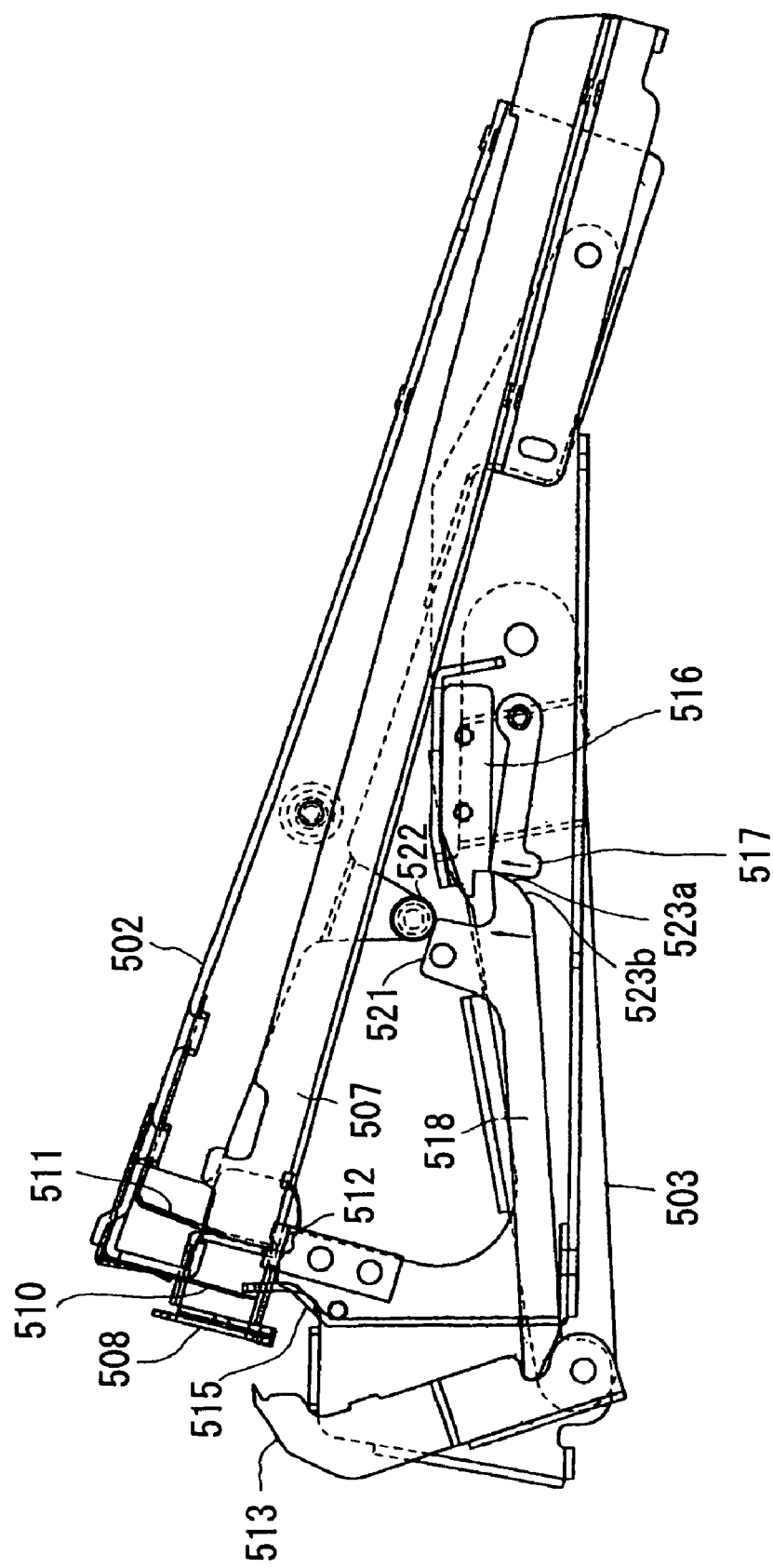
FIG. 24 is a side sectional view showing an operational step of the gardening binder.

Simultaneously therewith, the inclined cam face 523 at a rear end of the push plate 518 is butted to the clutch lever 517 and the push plate 518 start advancing cooperatively with downward movement of the driver handle 502. Further, when the driver 511 injects the staple to bind the tape and the cutter blade 510 cuts the tape as shown by FIG. 23, the picking plate 513 is pivoted to the front side to escape from the path of the cutter blade 510 and the rear end of the push plate 518 rides over the front face of the clutch lever 517. When the driver handle 502 and the clincher arm 503 are opened after finishing to bind the tape, as shown by FIG. 24, the push plate 518 released from being pressed by the roller 522 is moved up along with the clutch lever 517 by the torsional coil spring 520 shown in FIG. 18 and the rear end of the push plate 518 is engaged with the stopper 516 to return to an initial state of FIG. 19.

Figure 25:
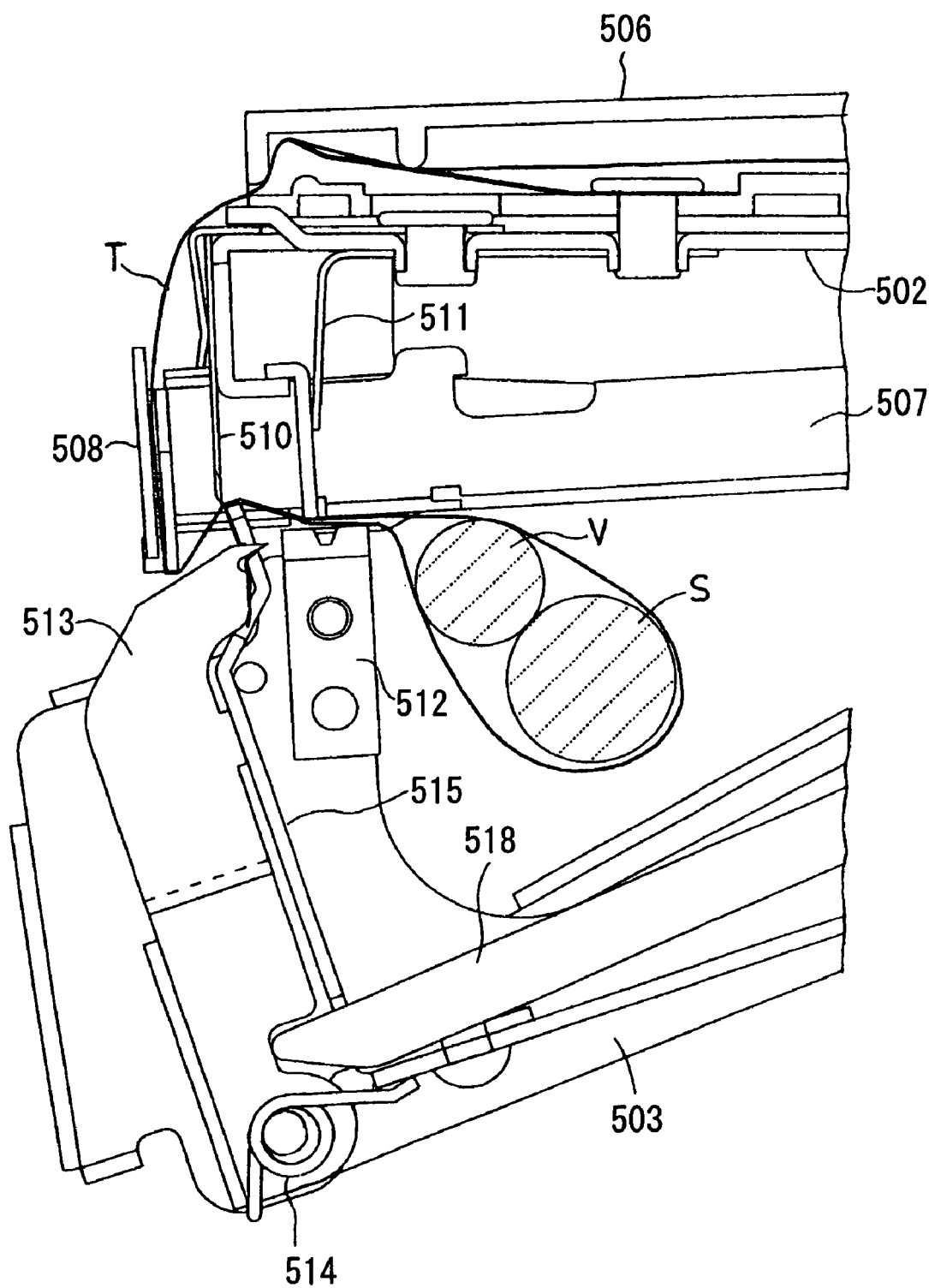
FIG. 25 is a side sectional view showing an operational step of the gardening binder.

Next, the gist of the invention will be explained in reference to FIG. 25 through FIG. 27. Further, notation S designates a stay and notation V designates an ivy. According to the gardening binder 1 of the invention, by lowering a height of an upper face of the picking plate 513 more than that of the related art type to prolong a distance to the upper face of the tape support plate 515 as shown by FIG. 25, the picking plate 513 is made to be able to press the tape T to the tape support plate 515 until the tape T is cut at the height of the upper face of the tape support plate 515. Further, dimensions of the inclined cam plate 523 at the rear end of the push plate 518 and the clutch lever 517 are set such that the picking plate 513 starts pivoting from when the cutter plate 510 is moved down to the height the same as that of the tape support plate 515 to thereby retard a timing of starting to pivot the picking plate 513 to the initial position on the front side more than that of the related art type. That is, a clearance is produced in the inclined cam face 523 and the clutch lever 517 as shown by FIG. 21 such that the picking plate 513 is not started to pivot until immediately before the cutter blade 510 is moved down to be brought into contact with the tape T and the inclined cam face 523 is constituted by a two stage variable speed structure of the lower cam face 523_a_ at which the speed of moving the push plate is fast and the upper cam face 523_b_ at which the speed is slow. By producing the clearance between the inclined cam face 523 and the clutch lever 517, until the cutter blade 510 is brought into contact with the tape T at a position of an upper edge of the front face of the tape support plate 515 as shown by FIG. 25, the rear end of the push plate 518 is not yet brought into contact with the clutch lever 517 as shown by FIG. 21, the front end portion of the tape T is held by the picking plate 513 and the tape support plate 515 to deviate from the path of the cutter blade 510 and therefore, the front end portion of the tape T is not cut.

Figure 22:
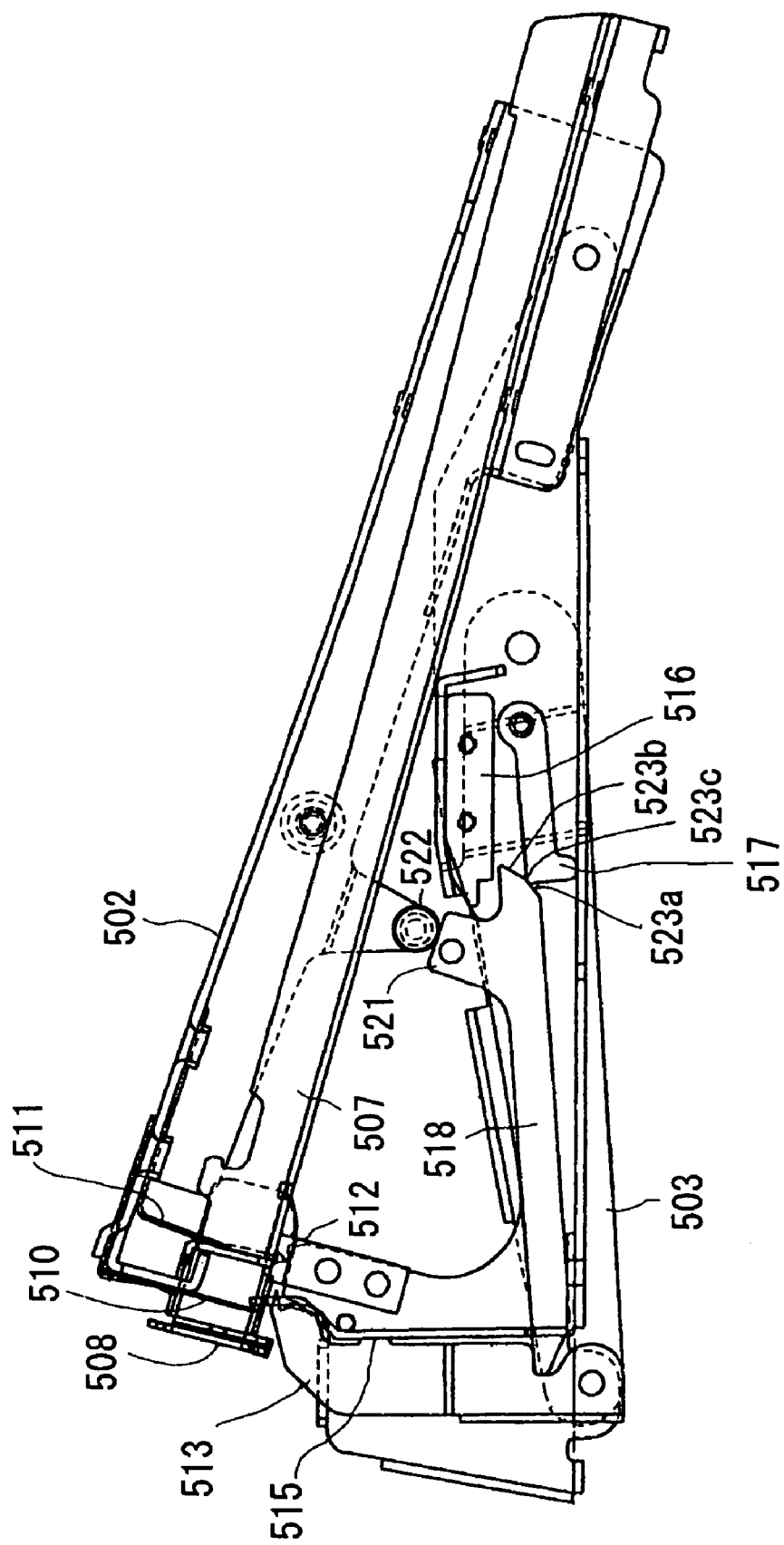
FIG. 22 is a side sectional view showing an operational step of the gardening binder.
Figure 26:
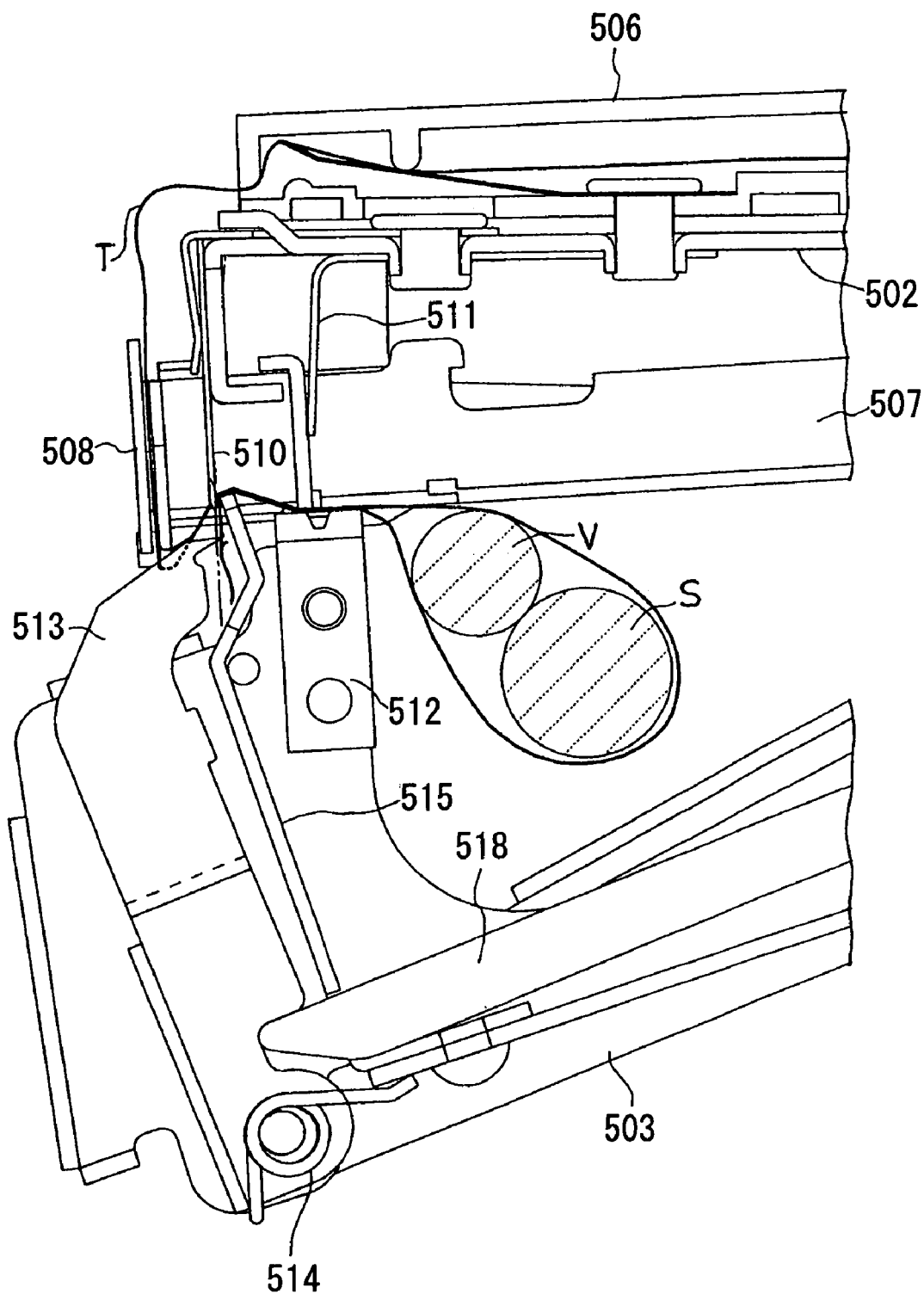
FIG. 26 is a side sectional view showing an operational step of the gardening binder.
Figure 27:
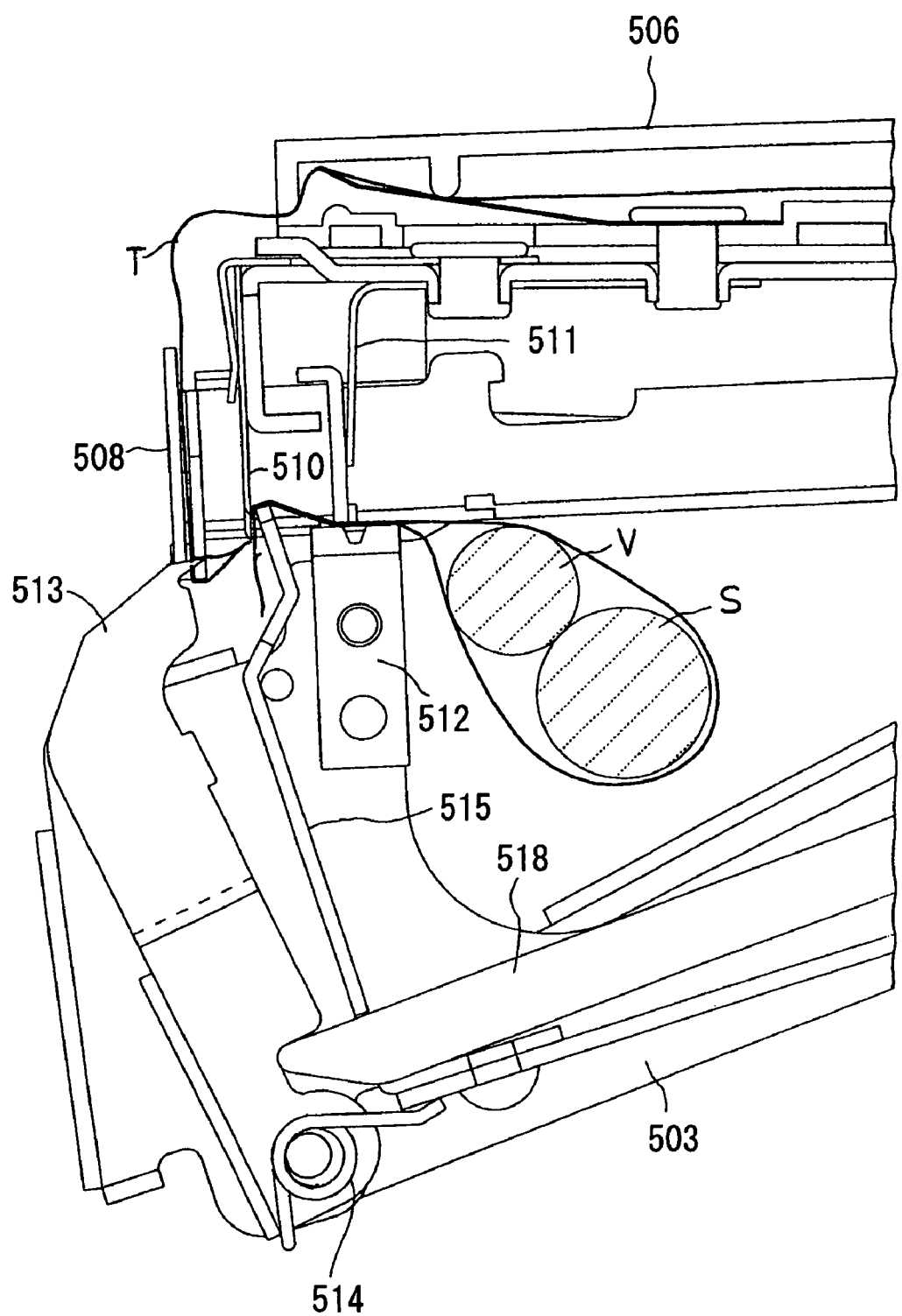
FIG. 27 is a side sectional view showing an operational step of the gardening binder.
Figure 28:
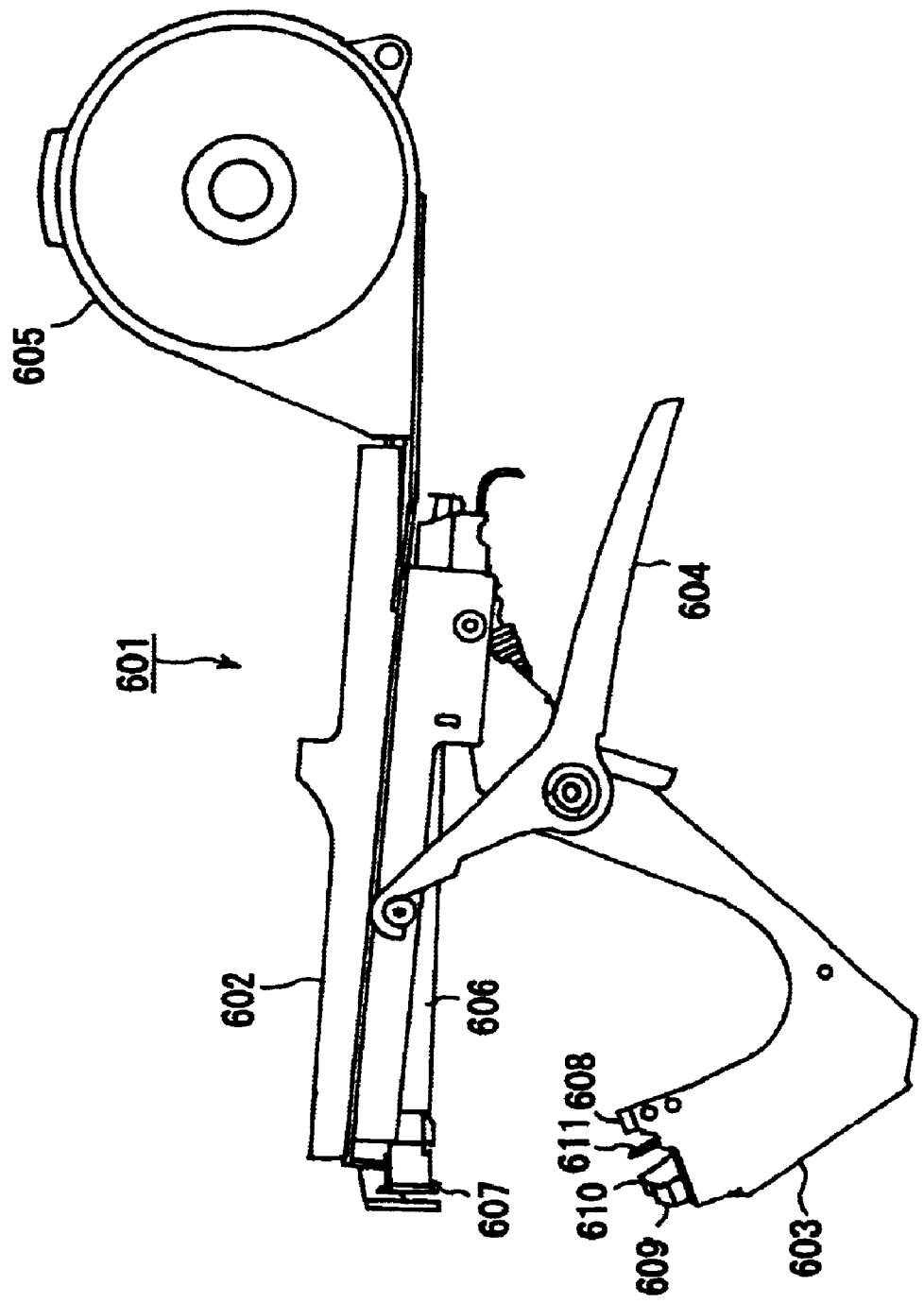
FIG. 28 is a side view of a gardening binder showing an example of a related art.
Figure 29:
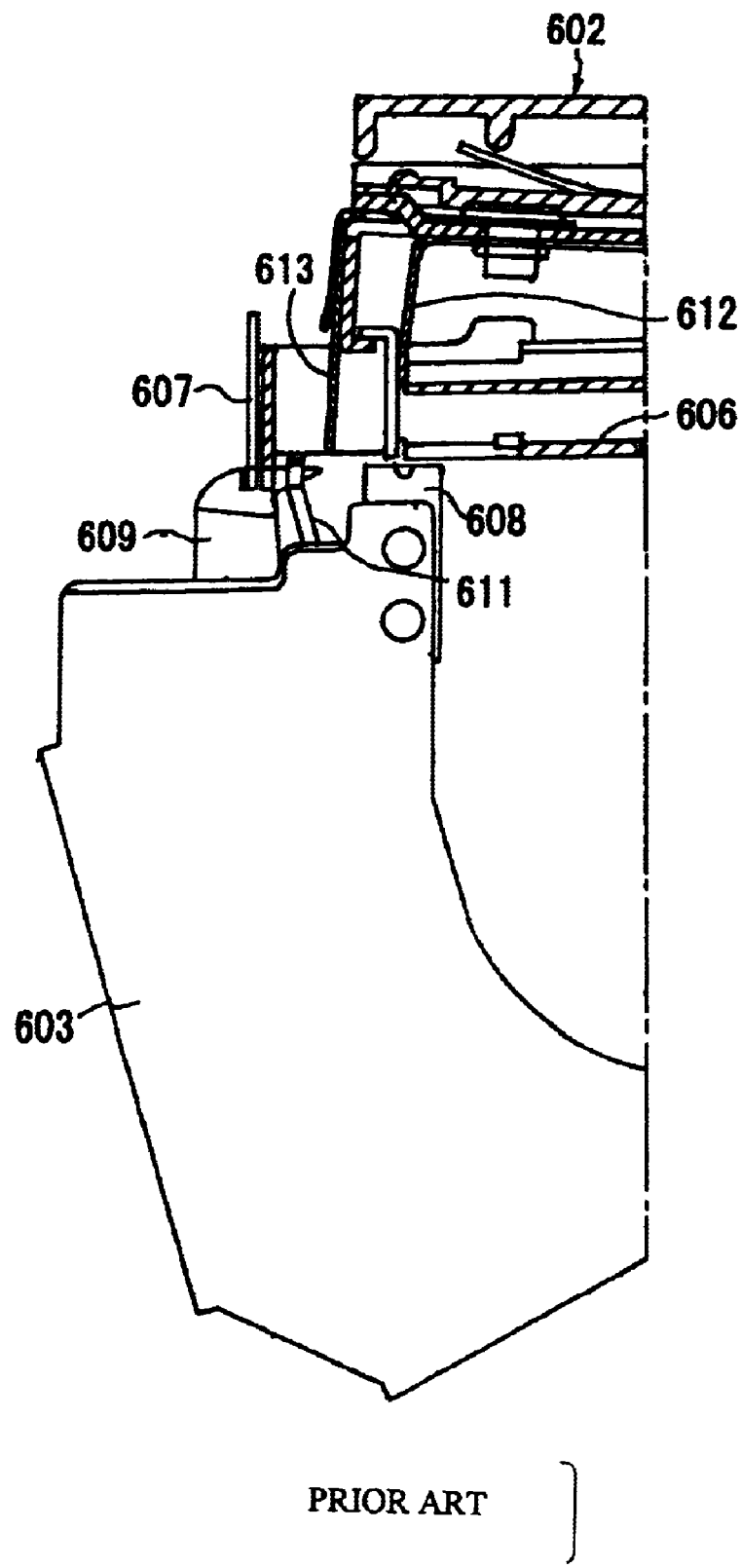
FIG. 29 is a sectional view of a front portion of the gardening binder of the related art.
Figure 30:
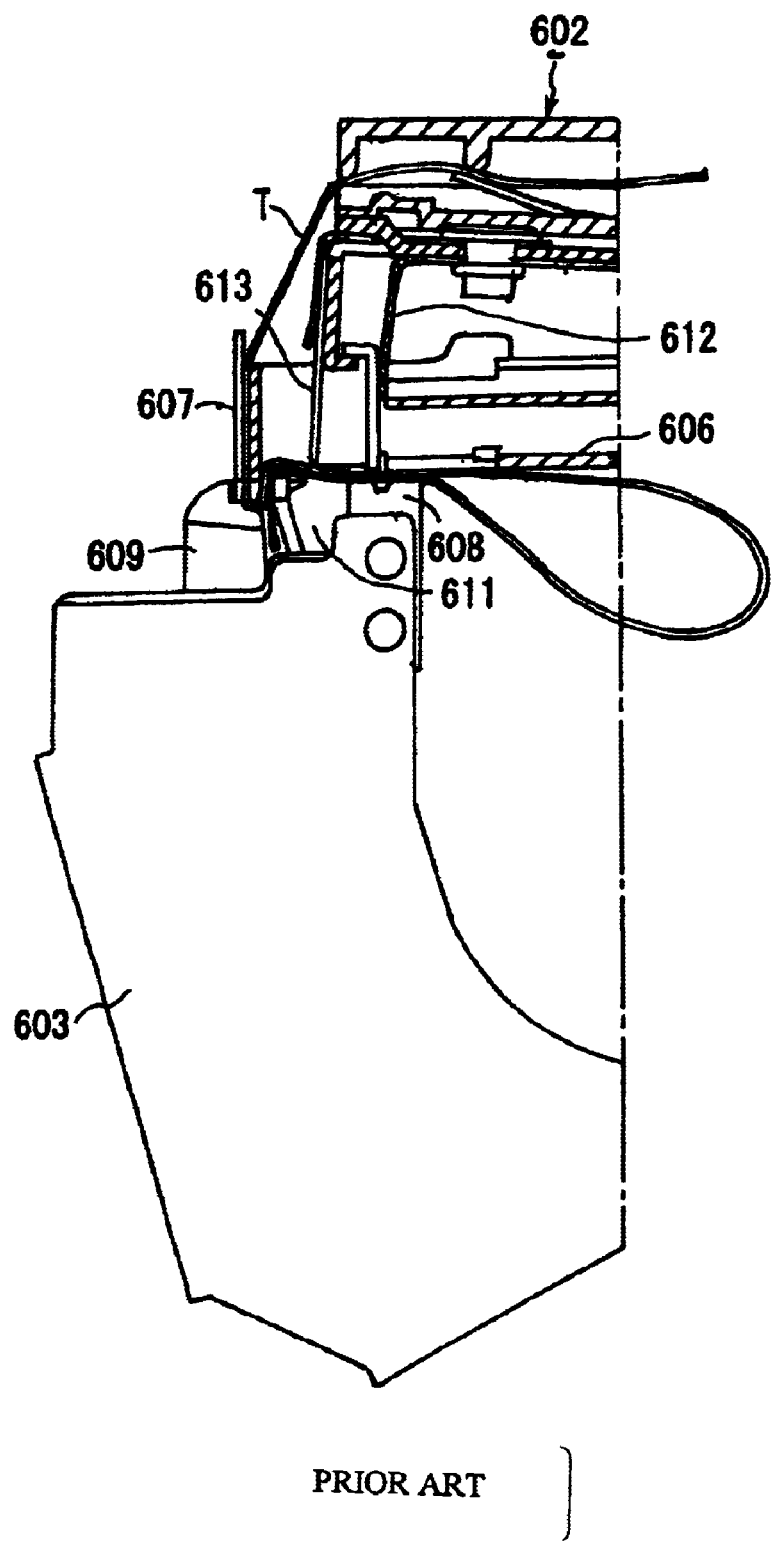
FIG. 30 is a sectional view of the front portion of the gardening binder showing a state of forming a tape loop showing the example of the related art.

FIG. 26 shows a state immediately after cutting the tape and by bringing a vicinity of the top point 523_c_ at which the lower cam face 523_a_ of the push plate 518 is switched to the upper cam face 523_b_ into contact with the clutch lever 517 as shown by FIG. 22 and further moving down the push plate 518, the picking plate 513 starts pivoting to separate from the tape support plate 515. At this occasion, the cutter blade 510 has already lowered to the upper face of the tape support plate 515 or lower and therefore, the front end portion of the tape T is brought into contact with a back face of the cutter blade 510 to maintain a state of being folded to bend. Thereafter, the push plate 518 is pressed to a front most position by operation of the upper cam face 523_b_ and as shown by FIG. 27, the picking plate 513 completely escapes from the path of the cutter blade 510 and the cutter blade 510 is moved down to a lower dead center.

Further, by lowering the height of the clincher 512 more than that of the related art type, at a time point at which the front end of the cutter blade 510 is moved down to the height of the upper plate of the tape support plate 515 as shown by FIG. 25, the staple magazine 507 is formed not to be brought into contact with the clincher 512 yet. Therefore, at the time point of FIG. 25, tension is hardly applied to the tape T at and after the tape guide 508, however, when the cutter blade 510 presses the tape T by narrowing the interval between the driver handle 502 and the clincher arm 503 as shown by FIG. 26, the staple magazine 507 is moved down to the position of the clincher 512 to push down the overlapped portion of the tape T to pinch along with the clincher 512.

In the related art, the front end of the cutter blade 510 is constituted to be brought into contact with the tape after the staple magazine 507 is brought into contact with the clincher 512 to pinch the tape and in this case, when the cutter blade 510 is moved down, the driver handle 502 is moved down to the staple magazine 507 to narrow an interval therebetween and therefore, a failure in cutting may be brought about by slacking the tape between the tape guide 506 attached to the driver handle 502 and the clincher 512. On the other hand, according to the invention, by pushing down the overlapped portion of the tape T to pinch after the cutter blade 510 is brought into contact with the tape T, the tape between the vertical tape guide 508 and the clincher 512 is pulled by the staple magazine 507 to apply tension and the cutter blade 510 can firmly cut the tape. Further, by elevating the height of the tape support plate 515 to further enlarge the distance between the upper end of the tape support plate 515 and the upper face of the clincher 512, the effective stroke of the cutter blade 510 is increased, which is effective against elongation of the tape.

The invention is not limited to the above-described embodiments but can variously be modified within the technical range of the invention and the invention is naturally extended to the modified embodiments.

The application is based on Japanese Patent Application filed on Jul. 11, 2001 (Japanese Patent Application No. 2001-211431), Japanese Patent Application filed on Aug. 8, 2001 (Japanese Patent Application No. 2001-241344), Japanese Patent Application filed on Aug. 10, 2001 (Japanese Patent Application No. 2001-244927), Japanese Patent Application filed on Mar. 20, 2002 (Japanese Patent Application No. 2002-77623) and Japanese Patent Application filed on Jun. 13, 2002 (Japanese Patent Application No. 2002-173097) and contents thereof are incorporated here by reference.

INDUSTRIAL APPLICABILITY

As has been explained above, according to the gardening binder of the invention, when the driver handle and the clincher arm are closed, the stopper portion provided at the picking plate of the tape grasping apparatus is constituted to impinge on the tape guide of the driver handle to stop the picking plate and therefore, when the claw of the picking plate pierces the front end portion of the tape extracted from the tape guide, rapid pulling tension is not applied on the tape and accident of breaking the tape by the claw can be prevented.

Further, according to the gardening binder of the invention, only the rear end of the tape loop hung around ivies and branches is cut and therefore, the residue of the tape is not brought about and a concern of bringing about a failure in picking the tape by piling up the residue of the tape or a failure of operation by packing the residue of the tape to the mechanism portion is resolved.

Further, according to the gardening binder of the invention, only the rear end of the tape loop hung around ivies and branches is cut and therefore, the residue of the tape is not brought about and a concern of bringing about a failure in picking the tape by piling up he residue of the tape or a failure in operation by packing the residue of the tape to the mechanism portion is resolved. Further, in cutting the tape, the front end of the tape is held at the position deviated from the path of the cutter blade and therefore, even in the case of a tape having strong elastic recovery force, the front end portion is not cut and stable motion can be expected.

Further, by preventing a portion of cutting the tape from being deformed by preventing the head portion of the picking plate from being brought into the center groove of the tape guide, the cutter blade is uniformly brought into contact with the tape, the tape can firmly be cut and a concern of a failure in cutting is resolved.

Further, the gardening binder of the invention is constituted such that in binding operation, after the cutter blade is moved down to the position of the upper end of the tape support plate to cut the tape, the picking plate is separated from the tape support plate and therefore, the front end portion of the tape is held outside of the path of the cutter blade by the picking plate until the tape is cut, regardless of the softness of the tape or a temperature environment, the front end portion of the tape can firmly be prevented from being cut and the residue of the tape is not brought about. Further, in cutting the tape, contrary to the related art type, the end portion of the tape is pinched by the clincher and the staple magazine after the cutter blade is brought into contact with the tape and therefore slack of the tape is resolved by pulling operation in pinching motion, even in the case of a thin tape which is easy to elongate, the tape can firmly be cut and binding function is stabilized.

What is claimed is:

1. A gardening binder comprising:
   a stapler;
   a driver handle of the stapler including a cutter blade;
   a tape guide provided at a front end of the driver handle and constituting a port of extracting a tape;
   a clincher arm combined with the driver handle; and
   a tape grasping apparatus including a picking plate driven by a cam mechanism and a tape support plate;
   wherein when the driver handle and the clincher arm are closed, a front end portion of the tape extracted from the tape guide is caught by the tape grasping apparatus, and after the driver handle and the clincher arm are opened and the tape stretched between the driver handle and the clincher arm is hung around a surrounding of an object to be bound, the driver handle and the clincher arm are closed to bind an overlapped portion of a tape loop by the staple and the tape is cut by the cutter blade; and
   wherein the picking plate includes a stopper portion at an upper portion thereof and when the driver handle and the clincher arm are closed, the stopper portion impinges on the tape guide to stop the picking plate, and by opening the driver handle and the clincher arm, the stopper portion is detached from the tape guide and the picking plate is brought into elastic contact with the tape support plate.

2. The gardening binder according to claim 1, wherein the picking plate includes a claw, and when the driver handle and the clincher arm are closed, the claw of the picking plate pierces the front end portion of the tape extracted from the tape guide to press to the tape support plate.

3. A gardening binder comprising:
   a stapler;
   a driver handle of the stapler including a cutter blade;
   a tape guide provided at a front end of the driver handle and constituting a port of extracting a tape;
   a clincher arm combined with the driver handle; and
   a tape grasping apparatus including a picking plate driven by a cam mechanism and a tape support plate;
   wherein when the driver handle and the clincher arm are closed, a front end portion of the tape extracted from the tape guide is caught by the tape grasping apparatus, and after the tape stretched between the driver handle and the clincher arm is hung around a surrounding of an object to be bound by opening the driver handle and the clincher arm, the driver handle and the clincher arm are closed to bind an overlapped portion of a tape loop by the stapler, and the cutter blade provided at the driver handle cuts the tape bypassing an interval between the picking plate and the tape support plate; and
   wherein in cutting the tape, the picking plate is regressed to separate from the tape support plate.

4. A gardening binder comprising:

a stapler;

a driver handle of the stapler including a cutter blade;

a tape guide provided at a front end of the driver handle and constituting a port of extracting a tape;

a clincher arm combined with the driver handle; and a tape grasping apparatus including a picking plate having a claw and a projected portion projected to a lower side of the claw more than the claw and is driven by a cam mechanism and a tape support plate;

wherein when the driver handle and the clincher arm are closed, a front end portion of the tape extracted from the tape guide is caught by the tape grasping apparatus, after the tape stretched between the driver handle and the clincher arm is hung around a surrounding of an object to be bound by opening the driver handle and the clincher arm, the driver handle and the clincher arm are closed to bind an overlapped portion of a tape loop by the stapler and the cutter blade cuts the tape; and wherein the cutter blade is arranged to move up and down between the picking plate and the tape support plate, and the cam mechanism is constituted such that the claw of the picking plate is escaped from a path of the cutter blade in cutting the tape and the projected portion holds the front end portion of the tape outside of a path of the cutter blade.

5. The gardening binder according to claim 4, wherein an interval between the claw of the picking plate and the projected portion therebelow is constituted by a recessed curved face.

6. The gardening binder according to claim 4, wherein a groove is formed from a center of a lower end of the tape guide in an upper direction and when the driver handle and the clincher arm are closed, the tape is pinched by a head portion of the picking plate and the groove of the tape guide; and wherein when the driver handle and the clincher arm are closed, a height of a lower end face of the tape guide and the height of a head portion of the picking plate substantially coincide with each other, the picking plate presses the tape to a lower end portion of the tape guide to pinch and the head portion of the picking plate advances to a depth side of the groove of the tape guide.

7. A gardening binder comprising:

a stapler;

a driver handle of the stapler including a cutter blade;

a tape guide provided at a front end of the driver handle and constituting a port of extracting a tape;

a clincher arm combined with the driver handle; and a tape grasping apparatus including a picking plate driven by a cam mechanism and a tape support plate;

wherein when the driver handle and the clincher arm are closed, a front end portion of the tape extracted from the tape guide is caught by the tape grasping apparatus, after the tape stretched between the driver handle and the clincher arm is hung around a surrounding of an object to be bound by opening the driver handle and the clincher arm, the driver handle and the clincher arm are closed to bind an overlapped portion of a tape loop by the stapler and the cutter blades cuts the tape; and wherein a height difference is provided between a height of the tape support plate and a height of the picking plate to bring the picking plate in a lower attitude and in operating to close the driver handle and the clincher arm, after the cutter blade is moved down to a position of an upper end of the tape support plate, the picking plate is separated from the tape support plate.

8. A gardening binder comprising:

a stapler;

a driver handle of the stapler including a staple magazine and provided with a cutter blade;

a tape guide provided at a front end of the driver handle and constituting a port of extracting a tape;

a clincher arm including a clincher and combined with the driver handle; and a tape grasping apparatus including a picking plate driven by a cam mechanism and a tape support plate;

wherein when the driver handle and the clincher arm are closed, a front end portion of the tape extracted from the tape guide is caught by the tape grasping apparatus, after the tape stretched between the driver handle and the clincher arm is hung around a surrounding of an object to be bound by opening the driver handle and the clincher arm, the front end portion of the tape is pinched by bringing the staple magazine and the clincher into contact with each other by closing the driver handle and the clincher arm, an overlapped portion of a tape loop is bound by the staple and the cutter blade cuts the tape; and wherein after the cutter blade is moved down to a position of an upper end of the tape support blade in operating to close the driver handle and the clincher arm, the staple magazine and the clincher are brought into contact with each other.

\* \* \* \* \*